US010825479B2

(12) United States Patent
Hershfield et al.

(10) Patent No.: US 10,825,479 B2
(45) Date of Patent: Nov. 3, 2020

(54) SYSTEMS AND METHODS FOR CROSS-REDACTION

(71) Applicant: Axon Enterprise, Inc., Scottsdale, AZ (US)

(72) Inventors: Jacob Hershfield, Seattle, WA (US); Michael Wilson, Seattle, WA (US); Daniel Bellia, Seattle, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 16/002,611

(22) Filed: Jun. 7, 2018

(65) Prior Publication Data
US 2019/0348076 A1 Nov. 14, 2019

Related U.S. Application Data

(60) Provisional application No. 62/670,421, filed on May 11, 2018.

(51) Int. Cl.
*G11B 27/028* (2006.01)
*H04N 7/18* (2006.01)
*G06F 16/78* (2019.01)

(52) U.S. Cl.
CPC ........ *G11B 27/028* (2013.01); *G06F 16/7867* (2019.01); *H04N 7/181* (2013.01)

(58) Field of Classification Search
CPC . G11B 27/028; G11B 27/031; G06F 16/7867; H04N 7/181
USPC ......... 386/282; 345/626; 348/143, 159, 169; 382/103
See application file for complete search history.

(56) References Cited

U.S. PATENT DOCUMENTS

| | | | |
|---|---|---|---|
| 8,615,106 B2 | 12/2013 | Wedge | |
| 9,449,647 B2 | 9/2016 | Sharpe et al. | |
| 9,460,340 B2* | 10/2016 | Kauffmann | G06K 9/00362 |
| 9,904,852 B2 | 2/2018 | Divakaran et al. | |
| 2006/0056056 A1* | 3/2006 | Ahiska | G08B 13/19608 |
| | | | 359/690 |
| 2008/0211903 A1* | 9/2008 | Davey | G06K 9/00771 |
| | | | 348/39 |

(Continued)

OTHER PUBLICATIONS

Patent Cooperation Treaty, International Search Report and Written Opinion of the International Searching Authority for international application PCT/US18/036510 dated Mar. 4, 2019.

*Primary Examiner* — Thai Q Tran
*Assistant Examiner* — Stephen R Smith
(74) *Attorney, Agent, or Firm* — Lawrence Letham

(57) ABSTRACT

Systems and methods for analyzing recorded data from one recording device, or a subset of recording devices to identify redactions that should be made to the recorded data. The identified redactions may be in accordance with a redaction policy. The identified redactions may be applied to recorded data recorded by other devices that recorded data the same incident. The redactions may be made to recorded data that was not analyzed prior to performing the redactions, so the redactions identified in one recorded data are performed in other recorded data that was not used to identify the types of redactions that should be made. Applying redactions to data that was not analyzed to determine what types of redactions should be made reduces the amount of time required to analyze recorded data for redaction.

20 Claims, 10 Drawing Sheets

(56) References Cited

U.S. PATENT DOCUMENTS

| | | | |
|---|---|---|---|
| 2009/0060271 A1* | 3/2009 | Kim | H04N 7/181 382/103 |
| 2009/0128632 A1* | 5/2009 | Goto | G01S 3/7864 348/169 |
| 2009/0316955 A1* | 12/2009 | Takeuchi | G06T 7/20 382/103 |
| 2010/0328460 A1* | 12/2010 | Merkel | G06K 9/00771 348/143 |
| 2012/0098854 A1* | 4/2012 | Ohnishi | G03B 21/26 345/626 |
| 2013/0182893 A1 | 7/2013 | Lavender et al. | |
| 2014/0139680 A1* | 5/2014 | Huang | G06K 9/6267 348/159 |
| 2014/0334676 A1* | 11/2014 | Skans | G06K 9/6201 382/103 |
| 2016/0063712 A1* | 3/2016 | Matsumoto | H04N 7/18 348/143 |
| 2016/0192009 A1* | 6/2016 | Sugio | G06K 9/3241 725/32 |
| 2016/0246996 A1 | 8/2016 | Khoo et al. | |
| 2017/0193309 A1* | 7/2017 | Kanda | H04N 7/183 |
| 2017/0300777 A1* | 10/2017 | Zhu | G06K 9/6202 |
| 2017/0352380 A1* | 12/2017 | Doumbouya | G06Q 10/00 |
| 2018/0115788 A1* | 4/2018 | Burns | G06K 9/00718 |
| 2018/0211355 A1* | 7/2018 | Newman | G06F 16/51 |
| 2019/0042869 A1* | 2/2019 | Tojo | G06K 9/3241 |
| 2019/0043207 A1* | 2/2019 | Carranza | G06T 7/292 |
| 2019/0045119 A1* | 2/2019 | Stokking | G06K 9/00758 |
| 2019/0045207 A1* | 2/2019 | Chen | G06K 9/72 |
| 2019/0068895 A1* | 2/2019 | Hutz | G06K 9/00771 |

\* cited by examiner

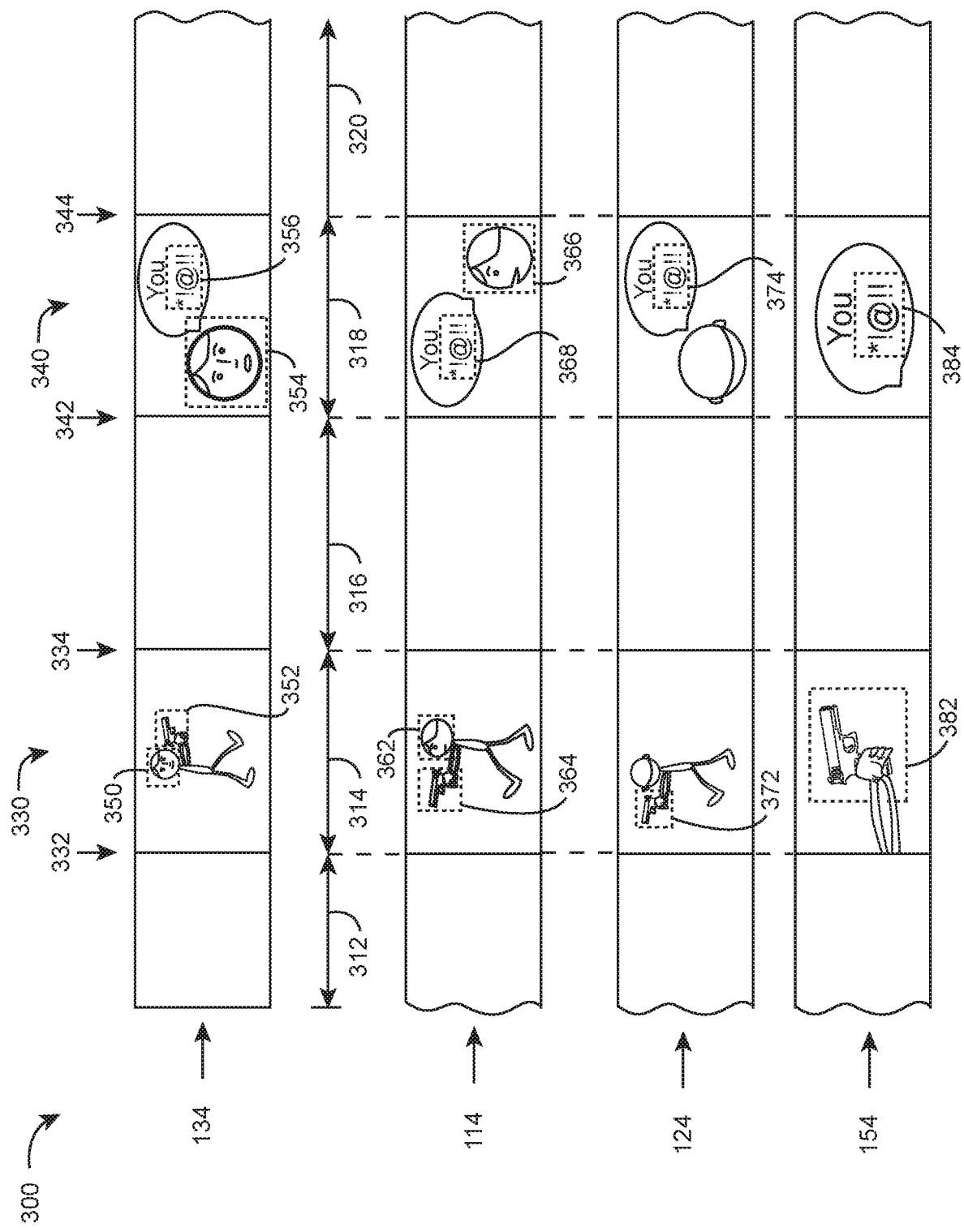

SYSTEMS AND METHODS FOR CROSS-REDACTION

FIELD OF INVENTION

Embodiments of the present invention relate to redacting data.

BRIEF DESCRIPTION OF THE SEVERAL VIEWS OF THE DRAWING

Embodiments of the present invention will be described with reference to the drawing, wherein like designations denote like elements, and:

FIG. 3 is a diagram of using redaction criteria to redact video and audio data;

DETAILED DESCRIPTION OF INVENTION

Introduction

Figure 1:
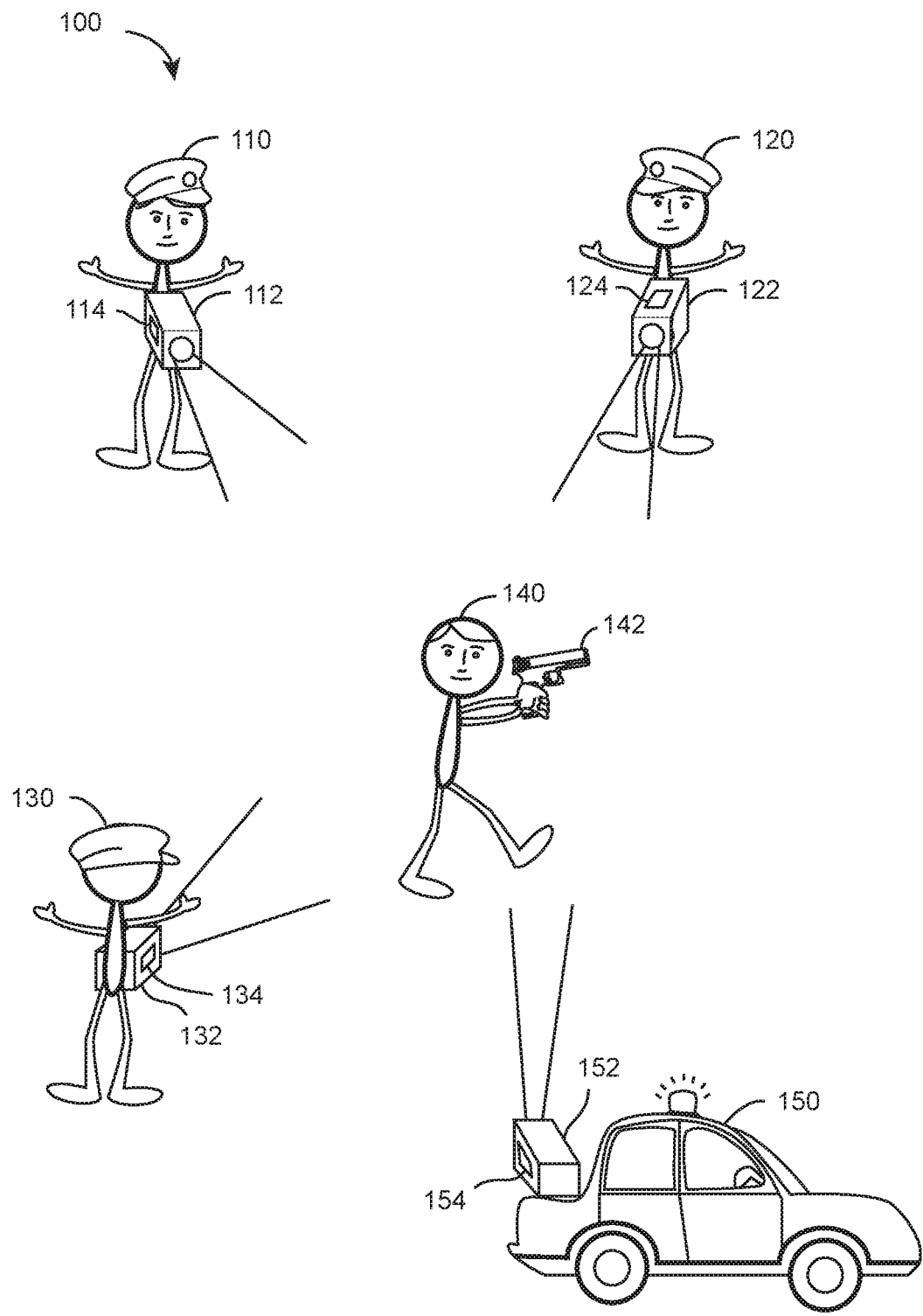
FIG. 1 is a diagram of recording devices at an incident.
Figure 2:
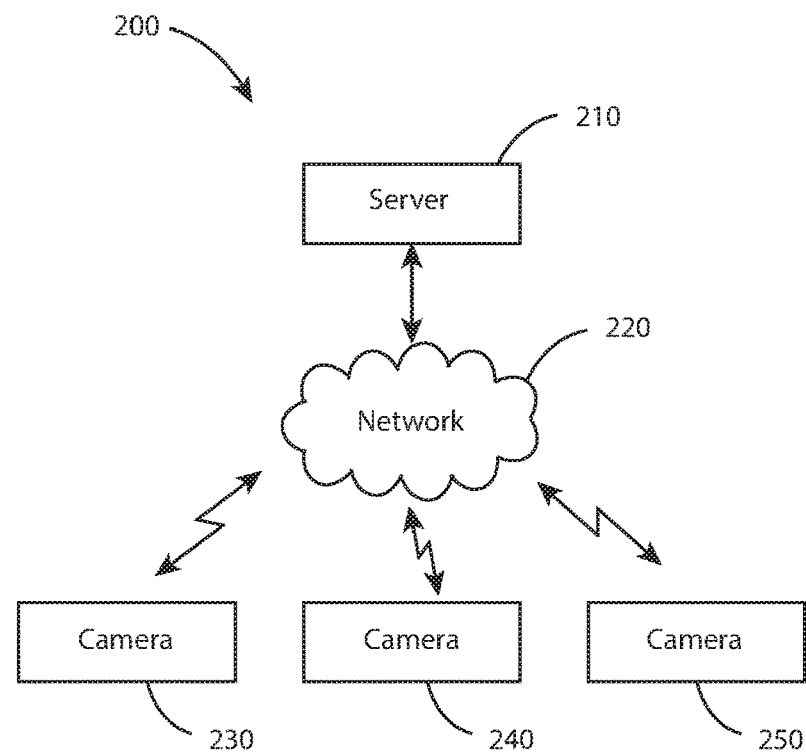
FIG. 2 is block diagram of a system for recording and redacting data according to various aspect of the present disclosure.

Police officers use recording devices (e.g., cameras, body-worn cameras, vehicle cameras, microphones, wireless microphones) to record what happens (e.g., occurrences) at an incident (e.g., event). Because body-worn cameras (e.g., still, video) are becoming more common place, the occurrences of an incident (e.g., the same incident) may be recorded by several recording devices. Each recording device may record the occurrences of the incident from a different perspective. The data recorded at the incident may be used as evidence of what happened at the incident.

Data recorded at an incident may be released to the public. For example, video data of an incident may be released to news agencies that report to the public regarding an incident. Recorded data may be redacted prior to public release. Recorded data may be redacted to protect the identities of people or to remove identifying information as to place or time. A policy may establish what type of information should be redacted from recorded data. The type of information redacted from recorded data may depend on the audience to whom the information will be released.

In a situation where many recording devices capture the occurrences of an incident, recorded data from a single recording device may be redacted for release while the recorded data from the other recording devices is withheld from release. In another approach, recorded data from multiple recording devices may be redacted and released.

According to various aspects of the present disclosure, recorded data from a subset (e.g., less than all, one) of a plurality of recording devices may be analyzed to identify locations in the recorded data where redactions should be made. At each identified location, the types of redactions that should be performed may be determined. The identified redactions may then be applied at the identified locations in the recorded data of all recording devices. Identifying redactions at specific locations in the recorded data for a subset of recording devices then applying the redactions to the specific locations in the recorded data of all recording devices saves processing time. Analyzing the recorded data from a few recording devices to identify redactions that should be made then applying the results of the analysis on the recorded data of all recording devices increases efficiency. Applying the redactions identified for a subset of the recording devices to the recorded data of all recording devices saves processing time because only the recorded data from the subset needs to be analyzed to identify redactions that should be made. Further only specified redactions in accordance with the analysis are made at specified locations in the recorded data of recording devices thereby saving further time and processing.

Using redaction information (e.g., redaction criteria) from the recorded data from one recording device, or a subset of recording devices, to identify redactions that should be made to the recorded data of another recording device, or recording devices, is referred to as cross-redaction.

Although video cameras are provided as an example of recording devices and audio/visual data as an example of recorded data, recording devices are not limited to video cameras and recorded data is not limited to audio/visual data (e.g., information).

Recording Devices at an Incident

Incident 100, shown in FIG. 1, is recorded by a plurality of recording devices. Police Officers 110, 120, and 130 have body-worn camera 112, 122, and 132 respectively. Vehicle 150 includes camera 152. Each camera records audio and visual occurrences (e.g., actions, happenings) of incident 100. Each camera captures the occurrences of incident 100 from a different perspective. Cameras 112, 122, 132, and 152 store recorded data 114, 124, 134, and 154 respectively. Recorded data includes a record of the occurrences captured by the recording device.

Recorded data may be stored on a recording device for later transfer to a server. For example, a recording device may include a memory for storing captured occurrences. Recorded data may be captured by a recording device and transmitted to another device (e.g., in-vehicle computer, cloud storage device, dock) for storage.

Recorded data from different recording devices may be aligned (e.g., synchronized) in time. Recorded data from different recording devices may be aligned in time for playback and/or analysis. Recorded data from different cameras may be aligned in time by finding the location of the same occurrence in the respective recorded data from each recording device. For example, if the recorded data includes the occurrence of a suspect firing a gun, aligning the recorded data from multiple recording devices may be accomplished by finding the location in each recorded data where the gun is fired. Once data is aligned, an occurrence in one recorded data may be found in the other recorded data because the recorded data from the different recording devices are aligned. Recorded data from multiple recording devices for the same incident is referred to as related data. Related data may be aligned in time so that an occurrence in one recorded data may be found in the other recorded data.

Recorded data from different recording devices may be aligned in any manner. In an implementation, each recording device records a time stamp to identify the same location in all recorded data. Time stamps may be provided and recorded during recording of the incident to permit the recorded data from each recording device to be synchronized with the recorded data of any other recording device at the incident. In another implementation, each recording device periodically transmits a beacon. The recording device that transmits the beacon records the beacon and associates the beacon with the point in the recorded data when the beacon was transmitted. The other recording devices receive one or more of the beacons. Each time a recording device receives a beacon, it records the beacon and associates the beacon with the time of receipt. The beacons may be used to align the data from the various recording devices by finding the same beacon in each recorded data.

For example, FIG. 3 shows some of audiovisual (e.g., video, audio) data from recorded data 134, 114, 124, and 154 that was recorded by cameras 132, 112, 122, and 152 respectively. The data from recorded data 134, 114, 124, and 154 have been aligned in time. Because recorded data 134, 114, 124, and 154 have been aligned, the occurrence that was recorded in recorded data 134 at location 330 may be identified in recorded data 114, 124, and 154. For example, during time period 314, recorded data 134 records an image of suspect 140 holding a gun. Time period 314 is identified as location 330. Location 330 may be single time in recorded data 134 or a range of time in recorded data 134. Location 330 may be identified by start 332 and end 334. Start 332 and end 334 may refer to a time (e.g., absolute time, time from start of recorded data) and/or a frame number. Start 332 and end 334 may have the same value to identify a point in time of a particular location in recorded data. Start 332 and end 334 may have different values to identify a range in time or a range of recorded data.

Time period 318 is identified as location 340. Location 340 may be single time in recorded data 134 or a range of time in recorded data 134. Location 340 may be identified by start 342 and end 344. Start 342 and end 344 may refer to a time (e.g., absolute time, time from start of recorded data) and/or a frame number. Start 342 and end 344 may have the same value to identify a point in time or a particular location in recorded data. Start 342 and end 344 may have different values to identify a range in time or a range of recorded data.

For video data, location 330 or 340 may be a single frame of video or multiple frames of video. Start 332 or 342 and end 334 or 344 may identify the same frame. Start 332 or 342 and end 334 or 344 may identify different frames to identify a range of frames of recorded data 134.

For audio data, location 330 or 340 may be a single point in time in the audio recorded data or a range of time in the audio recorded data. Start 332 or 342 and end 334 or 344 may identify the same point in time in recorded data 134. Start 332 or 342 and end 334 or 344 may identify different points in time to identify a range of audio data.

For other types of data, such as data recorded by a baton, handcuffs, a CEW, or other equipment, a location may be identified that may include a single point in time or a range in time.

Because recorded data 134, 114, 124, and 154 have been aligned, the location in recorded data 114, 124, and 154 that corresponds to location 330 or 340 in recorded data 134 may be identified. In this example, the recorded video is shown as frames of video data and audio data. The frames (e.g. location 330, location 340) corresponding to the recorded data 134 are aligned in time so that an occurrence recorded in recorded data 134 is presented at the same time as the occurrence in the recorded data 114, 124 and 154 even though the perspective of each recording device is different.

At location 330, recorded data 134 shows a front view of suspect 140. Location 330 in recorded data 114 shows a side view of the suspect 140, which was recorded at the same time as the front view was recorded in recorded data 134. Location 330 in recorded data 124 shows a rear view of the suspect 140, which was recorded at the same time as the front view and side view of recorded data 134 and 114 respectively. Location 330 in recorded data 154 shows only weapon 142 held by the suspect 140 because the rest of suspect 140 was not in the field of view of camera 152. Recorded data 154 at location 330 was recorded at the same time as front view in recorded data 134, side view in recorded data 114, and rear view in recorded data 124 all at location 330.

At location 340, recorded data 134 shows a front view of the face of suspect 140. At location 340, recorded data 134 further records the audible obscenity yelled by suspect 140. The obscenity is recorded as audio data but is shown visually as a speech balloon (e.g., speech bubble) for the purpose of showing that the obscenity was recorded as audio data at location 340. Location 340 in recorded data 114 shows a side view of the face of suspect 140 and the obscenity, which were recorded at the same time as the front view of the face and obscenity were recorded in recorded data 134. Location 340 in recorded data 124 shows a rear view of the head of suspect 140 and the obscenity, which were recorded at the same time as the front view of the face, side view of the face, and obscenity of recorded data 134 and 114 respectively. Location 340 in recorded data 154 does not show any part of the suspect 140 but records only the obscenity, which was recorded at the same time as the front view of the face in recorded data 134, the side view of the face in recorded data 114, and the rear view of the head in recorded data 124.

The location of an occurrence in any one related data (e.g., 134, 114, 124, 154) may be found in the other related data because the recorded data are aligned in time. For example, the location of an occurrence may be identified in recorded data 154 and corresponding locations found in recorded data 134, 114, and 124. The data recorded at the corresponding locations in recorded data 134, 114, and 124 may provide a different perspective of the occurrence that was recorded at the same time as the data recorded in recorded data 154.

Upload to and Functions of a Server

Once the recording at an incident is concluded, the respective recorded data from the various recording devices that were present at the incident may be uploaded to a server. Any method may be used to upload recorded data from a recording device to a server. In an implementation, recording devices may upload data to a server via a dock while the power supply in the recording device is being recharged by the dock. In another implementation, recording devices may upload recorded data to a server via a wireless connection to a network. For example, cameras (e.g., recording devices) 112, 122, 132, and 152 may wirelessly transmit their respective recorded data to server 210 via network 220. In another implementation, cameras 112, 122, 132, and/or 152 may transmit their respective recorded data to server 210 via a wired connection to network 220.

A server may store recorded data. A server may align recorded data. A server may analyze the recorded data from one or more recording devices. A server may analyze the recorded data from one or more recording devices to determine the types of redactions that should be made. A server may redact recorded data to provide a redacted version of the recorded data. A server may redact data in accordance with the analysis performed on the data to identify the types of redactions to perform.

A server may receive recorded data from multiple recording devices that recorded the same incident (e.g., related data). A server may analyze the recorded data from one or more, but not all, of the multiple recording devices. A server may analyze the recorded data from one or more, but not all, of the multiple recording devices to determine the location and types of redactions that should be performed. A server may align the recorded data from the multiple recording devices. A server may identify the location where a redaction should be performed in each recorded data. A server may perform the types of redactions identified to be performed at each location in each recorded data. A server may find the locations in the recorded data from all cameras where redaction should be performed and perform the types of redactions even though the location and type of redaction was determined by analyzing the recorded data from one or less than all of the cameras. In other words, a server may redact recorded data that was not analyzed to identify the location or the type of redaction that should be done.

As discussed above, analyzing a first recorded data to determine redactions and performing the identified redactions on a second recorded data is referred to as cross-redaction. Cross-redaction increases the efficiency of redaction because a subset of the recorded data from multiple recording devices is analyzed to determine redactions for the recorded data from all of the recording devices. Further, cross-redaction may increase efficiency because locations are identified in the recorded data to perform a subset of all possible redactions, thereby reducing the types of redactions and analysis that need to be performed at a location.

For example, server 210 may receive the recorded data from cameras 112, 122, 132, and, 152. Server 1200, an implementation of server 210, may receive recorded data 114, 124, 134, and 154 via communication circuit 1280 and via network 220.

Server 210 may store recorded data 114, 124, 134, and 154 from cameras 112, 122, 132, and, 152 respectively. In an implementation, server 1200 may store recorded data in data store 1250.

Server 210 may analyze the recorded data from one recording device or a subset of the recording devices. Server 210 may analyze the recorded data from one recording device or a subset of recording devices to determine the location and/or types of data that should be redacted. For example, server 210 may analyze recorded data 134. In this example, server 210 may analyze data 134 in its entirety. During analysis of data 134, server 210 may determine that face 350 of suspect 140 and weapon 352 at location 330 should be redacted. Locations in recorded data and the type of redactions that should be performed at the locations may be referred to as redaction criteria. For example, redaction criteria may include location 330 and that the redaction that should be performed is to redact faces. Redaction criteria may include one or more locations and one or more redactions that should be performed at each location.

Figure 6:
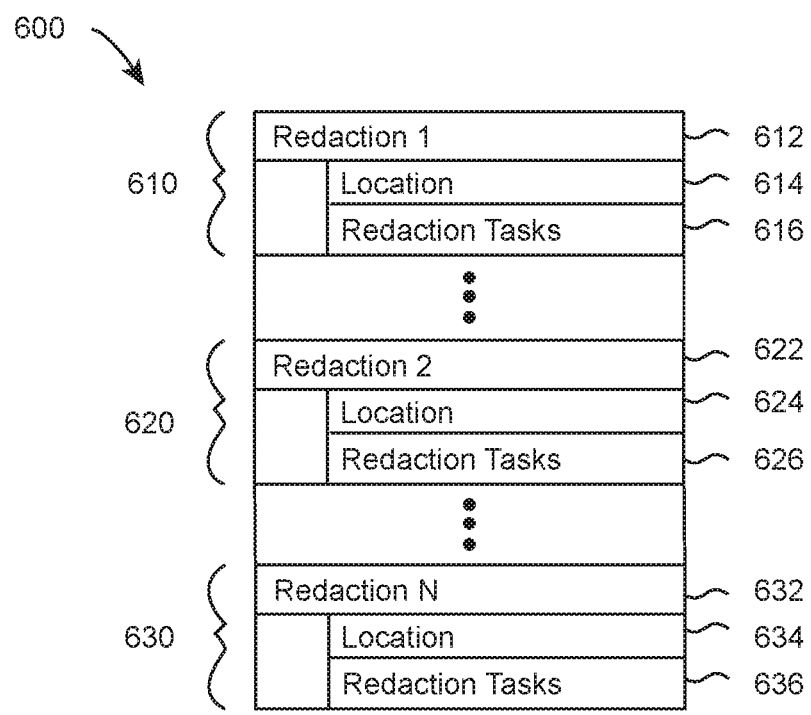
FIG. 6 is diagram of an implementation of a structure for storing redaction criteria.
Figure 12:
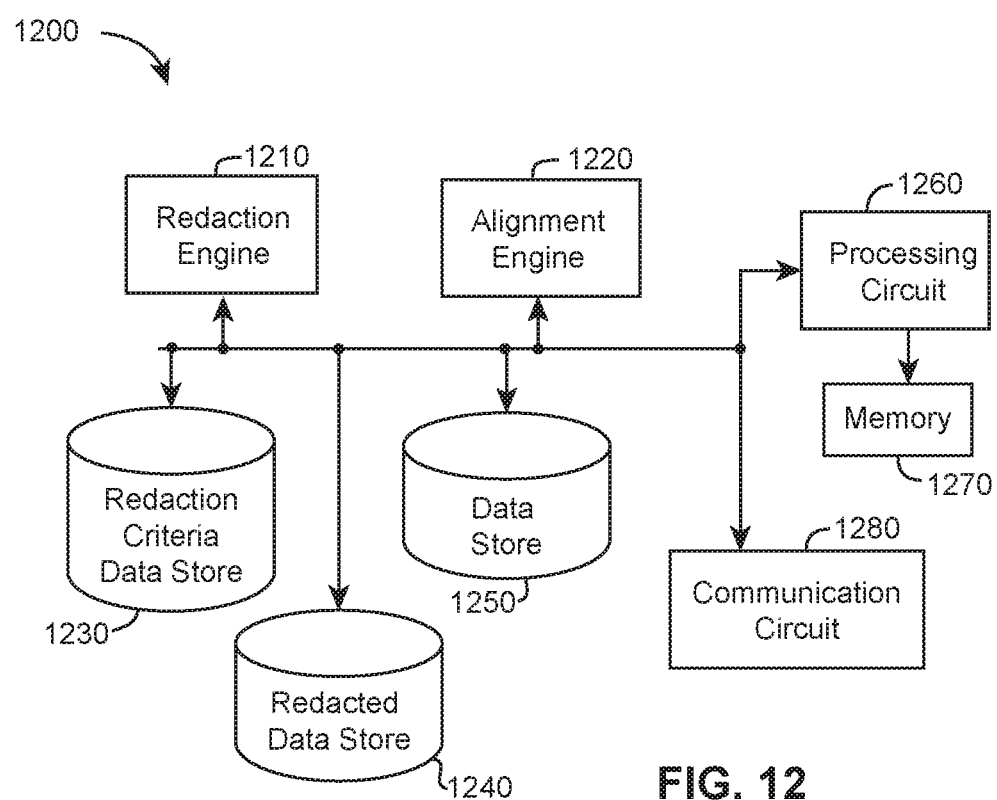
FIG. 12 is a block diagram of an implementation of the server of FIG. 2.

In an implementation, redaction engine 1210 of server 1200 analyzes recorded data 134. Redaction engine 1210 identifies location 330 as a location that includes data that should be redacted. Redaction engine 1210 identifies the redactions to be performed as redacting faces (e.g., face 350) and redacting weapons (e.g., weapon 352). Redaction engine 1210 generates redaction criteria for location 330. Redaction engine 1210 stores the redaction criteria in redaction criteria data store 1230. In an implementation, redaction criteria is stored in the format shown in FIG. 6.

Figure 10:
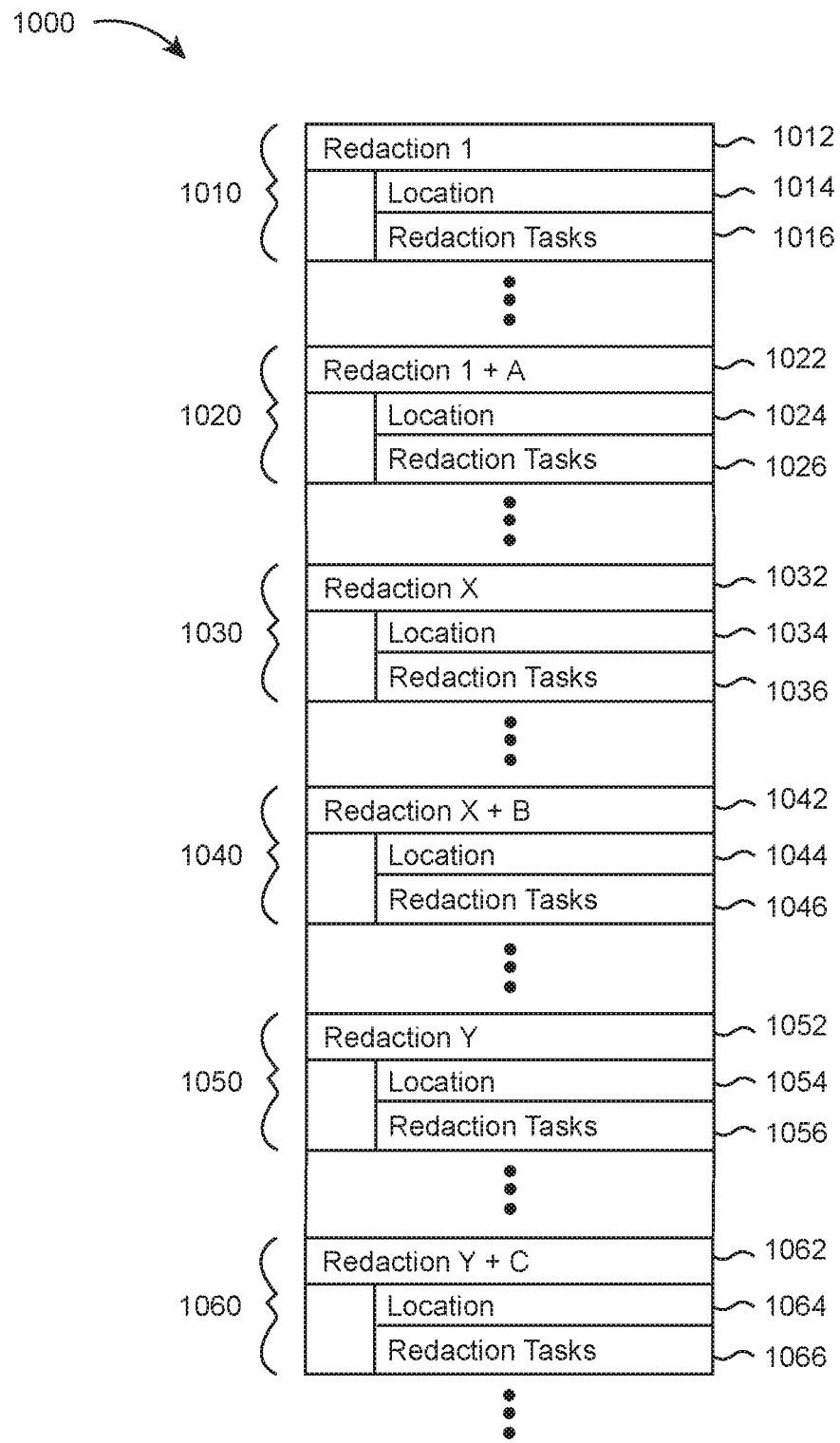
FIG. 10 is diagram of another implementation of a structure for storing redaction criteria.

In another example, server 210 analyzes a portion (e.g., 960, 966) of recorded data 910, a portion (e.g., 962, 968) of recorded data 920, and a portion (e.g., 964) of recorded data 930. Server 210 does not analyze any portion of recorded data 970. Server 210 generates redaction criteria for each portion (e.g., 960, 962, 964, 966, 968) analyzed. Server 210 stores the redaction criteria. In an implementation, redaction engine 1210 analyzes portions 960, 962, 964, 966, 968 of recorded data 910, 920, and 930. Redaction engine 1210 does not analyze the other portions (e.g., 942, 944, 950 of recorded data 910; 940, 944, 946, 950 of recorded data 920; 940, 942, 944, 948, 950 of recorded data 930, any portion of recorded data 970) of recorded data 910, 920, 930, and 970. Redaction engine 1210 creates redaction criteria for each portion of recorded data 910, 920, and 930 analyzed. Redaction engine 1210 stores the redaction criteria in redaction criteria data store 1230. In an implementation, redaction criteria for the analyzed portions of recorded data 910, 920, and 930 is stored in the format shown in FIG. 10.

Server 210 uses the redaction criteria to redact the recorded data from all recording devices. For example, server 210 identifies location 330 as a location in the aligned recorded data 134, 114, 124, and 154 that should be redacted. The redaction criteria identify the redactions that should be done as redacting faces and weapons. Server 210 finds location 330 in recorded data 134. Server 210, alone or with human assistance, identifies and redacts face 350 and weapon 352. Server 210 finds location 330 in aligned recorded data 114. Server 210, alone or with human intervention, identifies and redacts face 362 and weapon 364. Server 210 finds location 330 in aligned recorded data 124. At location 330 in recorded data 124, server 210 attempts to perform the identified redaction for faces by searching location 330 in recorded data 124 for a face. Server 210 cannot identify a face at location 330 in recorded data 124, so server 210 cannot perform that type of redaction. Server 210 can identify a weapon at location 330 in recorded data 124, so server 210 redacts weapon 372. Server 210 finds location 330 in aligned recorded data 154. Server 210, searches location 330 for faces; however, server 210 cannot identify any faces, so server 210 does not perform that type of redaction. Server 210 can identify a weapon at location 330 of recorded data 154, so server 210 redacts weapon 382.

In an implementation, redaction engine 1210 and/or processing circuit 1260 may access recorded data 134, 114, 124, and 154 from data store 1250. Recorded data stored in data store 1250 may include information for aligning recorded data 134, 114, 124, and 154 in time. Alignment engine 1220 and/or processing circuit 1260 may align recorded data 134, 114, 124, and 154. Redaction engine 1210 and/or processing circuit 1260 may access redaction criteria from redaction criteria data store 1230 for redacting aligned recorded data 134, 114, 124, and 154. Redaction engine 1210 may redact aligned recorded data 134, 114, 124, and 154 in accordance with the redaction criteria. Redaction engine 1210 and/or processing circuit 1260 may store the redacted data in redacted data store 1240.

Redaction

Figure 4:
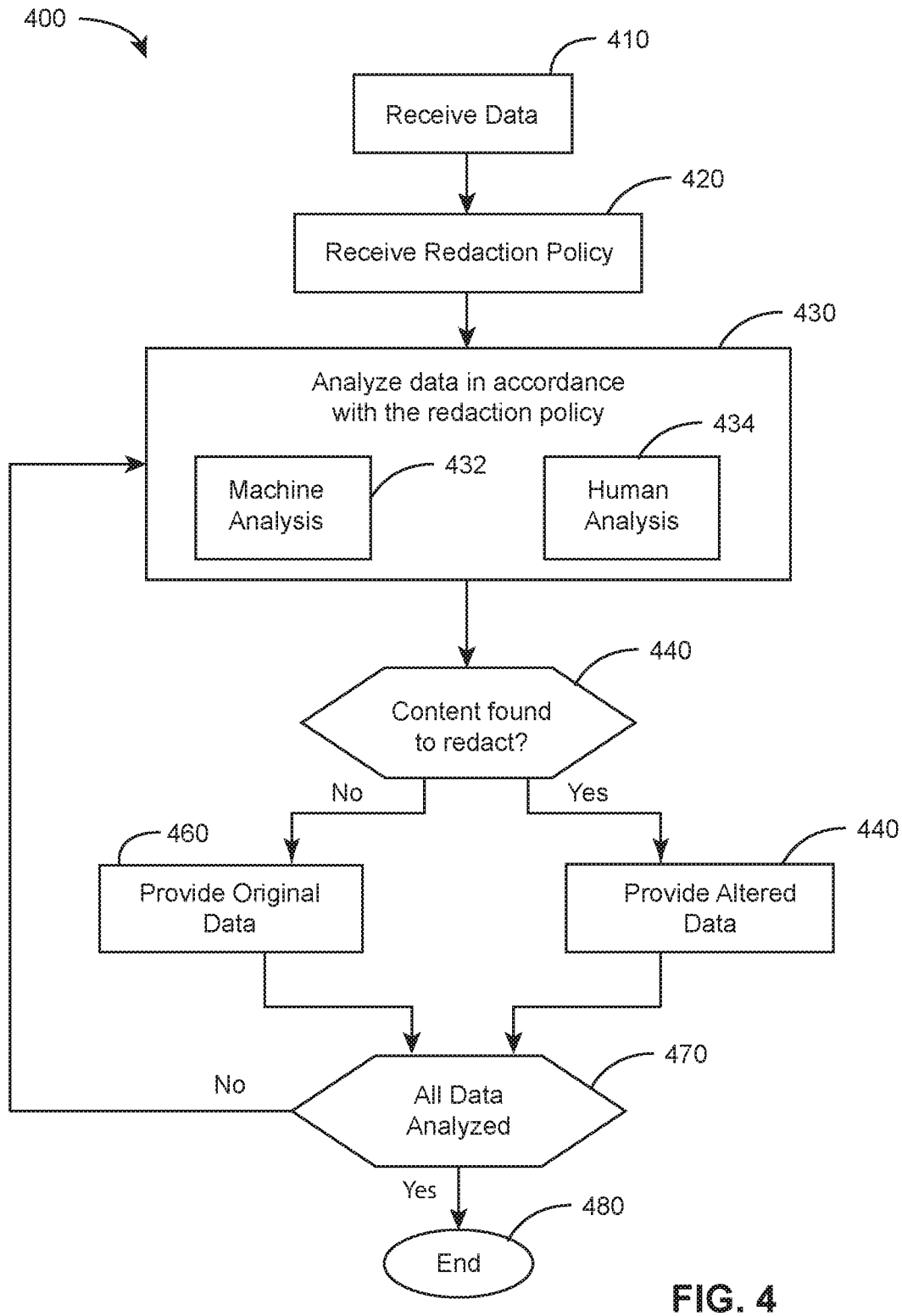
FIG. 4 is a diagram of a method for redacting data.
Figure 5:
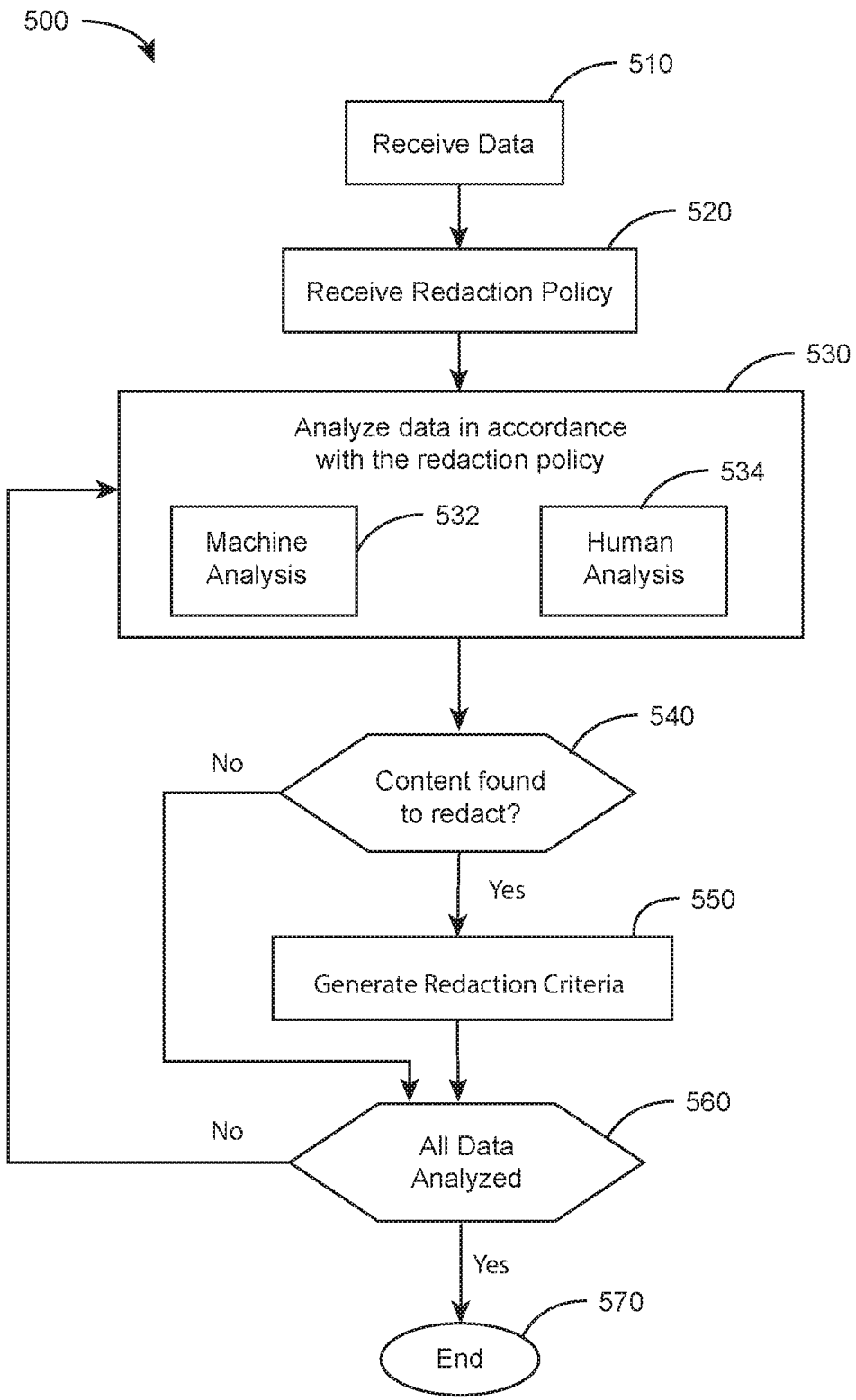
FIG. 5 is a diagram of a method for creating redaction criteria.

As discussed above, data may be analyzed to determine the location and types of redactions that should be made. Locations and types of redactions that should be performed may be determined in any manner. Method 400 of FIG. 4 is an implementation of a method for analyzing and redacting data to produce redacted data. Method 500 of FIG. 5 is an implementation of a method for analyzing data and producing redaction criteria. System 700 is an implementation of a system that uses redaction criteria to redact aligned recorded data (e.g., related data after alignment). Method 800 is an implementation of a method for using redaction criteria to redact recorded data.

Method 400

Method 400 of FIG. 4 includes receive original data 410, receive policy 420, analyze 430, found 440, original 460, redacted 450, all analyzed 470, and end 480. Analyze 430 includes machine analysis 432 and human analysis 434. Method 400 may be performed by a server, such as server 210.

Receive Original Data 410

Receive original data 410 receives original data. Original data may include data that has not been redacted. Original data may include data that has been previously redacted in accordance with a first redaction policy and is being received to redact the data in accordance with a second redaction policy. Original data may include recorded data. Original data may include data recorded by recording devices at the incident. For example, as discussed above, cameras 112, 122, 132 and 152 while present at incident 100 capture and store recorded data 114, 124, 134 and 154 of the incident 100. Receive original data 410 may be accomplished by receiving recorded data 114, 124, 134 or 154 from camera 112, 122, 132 or 152 respectively. As discussed above, recorded data 114, 124, 134 and 154 may be transferred to server 210 for storage in data store 1250. Receive original data 410 may be accomplished by retrieving data from data store 1250. Execution of method 400 moves from receive original data 410 to receive policy 420.

Receive Policy 420

Receive policy 420 receives a redaction policy. A redaction policy may establish (e.g., define, identify, describe) the type of information that should be redacted from original data. For example, a redaction policy may specify that faces, weapons, license plates, street signs, clocks, address, names, personal information, and vulgarities be redacted. A redaction policy may specify that the faces of officers, weapons held by officers, or speech utter by officers not be redacted, but that such data be redacted for all other parties shown in the recorded data. A redaction policy may specify that faces, but not tattoos be redacted. A redaction policy may include any rule to redact any type of information.

The information identified in a redaction policy for redaction may depend on how the redacted data will be used. The information identified in a redaction policy for redaction may depend on the reasons for redacting the data. For example, a redaction policy may be developed to redact data for public release without prejudicing potential jurors, releasing private information, identifying bystanders to an incident, and/or offending the sensibilities of the public. Public, pre-trial release may require that more information be redacted. A redaction policy may be developed to comply with a court order or law. Data redacted to comply with a court order or law may be specific as to the facts of an occurrence without concern for releasing private information.

The institution redacting the data may specify the redaction policy. The institution that captures the recorded data may specify the redaction policy. A person and/or institution that controls release of recorded data may specify the redaction policy.

A redaction policy may be received by receive policy 420 in any manner. In an implementation where server 210 receives the redaction policy, the redaction policy may be stored in an electronic format.

Execution of method 400 moves from receive policy 420 to analyze 430.

Analyze 430

Analyze 430 analyzes the original data in accordance with the redaction policy. Analysis uses any suitable method and/or apparatus for analyzing data. Analyze 430 determines whether the original data includes information that is identified for redaction by the redaction policy. Analyze 430 may identify the location of the information in the original data that should be redacted in accordance with the redaction policy. Analyze 430 may store the location of where the information was found that should be redacted. Analyze 430 may store the type of analysis performed to identify the information that should be redacted. Analyze 430 may identify and/or store the types of tasks that should be performed to redact the data.

Analyze 430 may identify specific portions of data for redaction. Analyze 430 and/or a redaction policy may identify the manner (e.g., remove, obscure, blur, alter) in which the data should be redacted. Analyze 430 may redact original data in accordance with the analysis. Analyze 430 may provide redacted data and/or original data.

Machine Analysis 432

Analysis of original data to identify information that should be redacted may be performed by a machine, a human, or any combination thereof and in any order. Machine analysis 432 includes any type of machine implemented method for analyzing data, construing a redaction policy, and/or identifying information in the original data in accordance with the redaction policy. Machine analysis 432 may be performed by a processing circuit (e.g., processing circuit 1260) executing a stored program. Machine analysis may apply predictive algorithms to analyze data. Machine analysis 432 may include one or more algorithms for analyzing original data. Machine analysis 432 may select one or more algorithms for use to analyze original data in accordance with the redaction policy. Algorithms used for machine analysis may be developed using machine learning techniques. Machine analysis 432 may use (e.g., execute) algorithms serially or in parallel to analyze original data. Machine analysis 432 may redact the identified information. Machine analysis 432 may provide the redacted data.

A machine (e.g., server, processing circuit) that performs analysis may analyze any type of data (e.g., video, audio). A machine may construe a redaction policy, analyze the original data in accordance with the policy, and identify data in the original data that should be redacted. A machine may identify specific portions (e.g., pixels, frequencies) of original data that should be redacted.

Human Analysis 434

Human analysis 434 includes any type of analysis performed by a human operator. Human analysis may include machine-aided presentation (e.g., playback video, playback sound, slow motion, fast motion, fast forward, back lighting, contrast adjustment, removal of color, reduction of resolution, zoom) of the data. A human may use any sense (e.g., vision, smell, tactile, hearing) for perceiving the original data. The human may mentally assess the perceived original data in accordance with the redaction policy to detect information that should be redacted. A human may use a machine (e.g., processing circuit) to identify and store the location of the information that should be redacted. A human may use a machine to identify a specific portion of the original data for redaction. A human may use a machine to store the reason for redaction and/or the task performed or to be performed to redact the data. A human may use a machine to redact (e.g., remove, obscure, blur, alter) the information identified by the human and in accordance with the redaction policy. A human may use a machine to provide the redacted data.

Analyze 430 may analyze and/or redact any portion of the original data prior to moving to found 440. Analyze 430 may provide redacted data and/or original data to found 440, original 460 and/or altered 450.

Example of Analyze 430

For example, analyze 430 may be used to analyze recorded data 134 of FIG. 3. Recorded data 134 may be provided to method 400 as original data via receive original data 410. Analyze 430 uses the policy received by receive policy 420 to determine that no redaction of recorded data 134 is necessary during time periods 312, 316, and 320.

During time period 314, analyze 430 identifies, in accordance with the redaction policy, information in recorded data 134 that should be redacted. In this example, assume that the redaction policy specifies that all faces, weapons, and obscenities be redacted. During time period 314, analyze 430 identifies a face and a weapon. Having identified information that meets the redaction policy, analyze 430 determines the location of the information. In this case, the location may be a single frame of video data or multiple frames of video data. Analysis identifies the location where the redaction should be made as location 330. Location 330 begins at start 332 and ends at end 334. Location 330 may be coextensive with time period 314. Start 332 may be the start of a frame of video information and end 334 may be the end of the same frame. Start 332 may be the start of a frame of video information and end 334 may be the end of a frame time period 314 later.

Analyze 430 may identify all information (e.g., entire frame or frames) at location 330 as needing redaction since a portion of the data at location 330 should be redacted. Analyze 430 may analyze the information at location 330 and identify only a portion of the data as needing redaction. In this case, analyze 430 detects and identifies the pixels of face 350 as needing redaction. Analyze 430 may further detect and identify the pixels of weapon 352 as needing redaction. Analyze 430 may identify location 330 as needing redaction but may also identify any subset or portion (e.g., frame) of location 330 between start 332 and end 334 as needing redaction. Analyze 430 may provide (e.g., generate) any information needed to identify the portions of data at location 330 that need redacting. In this example, analyze 430 may identify specific pixels in each frame at location 330 that should be altered to comply with the redaction policy.

During time period 318 (e.g., location 340), analyze 430 identifies information that should be redacted. During time period 318, analyze 430 identifies a face and an obscenity. Analyze 430 determines the location of the information that should be redacted. As with time period 314, time period 318 may include a single or multiple video frames. Analyze 430 identifies location 340 having start 342 and end 344 as a location that needs redaction. Location 340 may be coextensive with time period 318. Start 342 may be the start of a single frame or many frames with end 344 corresponding to the last frame.

As discussed above, analyze 430 may redact the all data (e.g., entire frame or frames) at location 340 because some data should be redacted, or analyze 430 may identify specific portions of the data at location 340 that should be redacted. In this case, analyze 430 detects and identifies the pixels of face 354 as needing redaction. Analyze 430 may further detect and identify only the portion of the audio track that contains the obscenity as needing redaction. When redacting sound, analyze 430 may redact all sounds during the time period of the obscenity or alter to the extent possible only the sound of the obscenity while preserving other sounds detected at the same time. Analyze 430 may provide (e.g., generate) any information needed to identify the portions of data at location 340 that need redacting. In this example, analyze 430 may identify specific pixels in each frame, a specific portion of the audio track, or particular frequencies of the audio track at location 340 that should be altered to comply with the redaction policy.

Analyze 430 may generate and/or store any information to identify a location in recorded data 134 that should be redacted. Analyze 430 may generate and/or store any information to identify what action was taken at a location to redact data.

Found 440

Found 440 may receive receives both original data and redacted data and/or original data may be provided to original 460 and redacted data provided to altered 450. Found 440 and/or original 460 may receive original data from analyze 430. Found 440 and/or altered 450 may receive redacted data from analyze 430. Found 440 may receive information as to the location of the redacted data with respect to the original data. Found 440 may provide data to original 460 and/or altered 450. Found 440 determines whether analyze 430 redacted information. In the event that analyze 430 redacted data, execution moves to redacted 450. In the event that analyze 430 did not redact data, execution moves to original 460. Found 440 may provide original and redacted data to original 460 and redacted 450 respectively or original 460 and altered 450 may receive original data and redacted data respectively from analyze 430. Found 440 may provide instructions to original 460 and/or altered 450 as to which data to provide to form redacted data.

Original 460

Original 460 provides original data for the portions of original data that analyze 430 determine that no redaction need be made. Original 460 may receive original data from found 440, analyze 430 and/or receive original data 410. Execution moves to all analyzed 470.

Redacted 450

Redacted 450 provides redacted data for the portions of original data that analyze 430 determine should be redacted. Redacted 450 receives redacted data from found 440 and/or analyze 430. Execution moves to all analyzed 470.

The data provided by original 460 and redacted 450 includes the original and redacted version of the data received by receive original data 410. The data from original 460 and altered 450 are combined to form the data that includes the redactions identified and made by analyze 430. The data provided by original 460 and redacted 450 may be a portion or all of recorded data from a recording device.

All Analyzed 470

All analyzed 470 determines whether the data received by receive 410 has been analyzed and redacted if necessary. If all of the data received by receive 410 has not been analyzed and redacted if necessary, execution moves to analyze 430. If all of the data received by receive 410 has been analyzed and redacted if necessary, execution moves to end 480.

Method 400 terminates at end 480.

Using method 400 requires that all data be analyzed by analyze 430 to determine whether redactions to the data should be made. The analysis from one recorded data (e.g., 134) cannot be applied to other recorded data (e.g., 114, 124, 154).

Method 500

Method 500 of FIG. 5 includes steps receive original data 510, receive policy 520, analyze 530, found 540, generate 550, all analyzed 560, and end 570. Analyze 530 includes machine analysis 532 and human analysis 534. Method 500 may be performed by a server, such as server 210.

Receive Original Data 510

Receive original data 510 performs the functions discussed above with respect to receive original data 410. Execution moves from receive original data 510 to receive policy 520.

Receive Policy 520

Receive policy 520 performs the functions discussed above with respect to receive policy 420. Execution moves from receive policy 520 to analyze 530.

Analyze 530, Machine Analysis 532, Human Analysis 534

Analyze 530 performs the functions discussed above with respect to analyze 430. Machine analysis 532 performs the functions discussed above with respect to machine analysis 432. Human analysis 534 performs the functions discussed above with respect to human analysis 434. Execution moves from analyze 530 to found 540.

The example of analysis performed by analyze 430 as discussed above is applicable to the analysis performed by analyze 530. For example, analyze 530 may be used to analyze recorded data 134 of FIG. 3. Recorded data 134 may be provided to method 500 as original data via receive original data 510. Analyze 530 uses the policy received by receive policy 520 to determine that no redaction of recorded data 134 is necessary during time periods 312, 316, and 320.

During time period 314, analyze 530 identifies, in accordance with the redaction policy, information in recorded data 134 that should be redacted. In this example, assume that the redaction policy specifies that all faces, weapons, and obscenities be redacted. During time period 314, analyze 530 identifies a face and a weapon. Having identified information that meets the redaction policy, analyze 530 determines the location of the information. In this case, the location may be a single frame of video data or multiple frames of video data. Analysis identifies the location where the redaction should be made as location 330. Location 330 begins at start 332 and ends at end 334. Location 330 may be coextensive with time period 314. Start 332 may be the start of a frame of video information and end 334 may be the end of the same frame. Start 332 may be the start of a frame of video information and end 334 may be the end of a frame time period 314 later.

Analyze 530 may identify all information (e.g., entire frame or frames) during time period 314 as needing redaction since a portion of the data of time period 314 should be redacted. Analyze 530 may mark entire frames to be redacted. Analyze 530 may also analyze the information of time period 314 and identify only a portion of that data as needing redaction. In this case, analyze 530 detects and identifies the pixels of face 350 as needing redaction. Analyze 530 may further detect and identify the pixels of weapon 352 as needing redaction. Analyze 530 may identify location 330 as needing redaction and may identify in any subset or portion (e.g., frame) of location 330 between start 332 and end 334 as needing redaction. Analyze 530 may provide (e.g., generate) any information needed to identify the portions of data at location 330 that need redacting. In this example, analyze 530 may identify specific pixels in each frame at location 330 that should be altered to comply with the redaction policy.

During time period 318, analyze 530 identifies information that should be redacted. During time period 318, analyze 530 identifies a face and an obscenity. Analyze 530 determines the location of the information that should be redacted. As with time period 314, time period 318 may include a single or multiple video frames. Analyze 530 identifies location 340 having start 342 and end 344 as a location that needs redaction. Location 340 may be coextensive with time period 318. Start 342 may be the start of a single frame or many frames with end 344 corresponding to the end.

As discussed above, Analyze 530 may identify all information (e.g., entire frame or frames) during time period 318 as needing redaction since some data should be redacted, or analyze 530 may identify specific portions of the data during time period 318 that should be redacted. In this case, analyze 530 detects and identifies the pixels of face 354 as needing redaction. Analyze 530 may further detect and identify the portions of the audio track that contains the obscenity as needing redaction. When redacting sound, analyze 530 may redact all sounds during the time period of the obscenity or alter to the extent possible only the sounds of the obscenity while preserving other sounds detected at the same time. Analyze 530 may provide (e.g., generate) any information needed to identify the portions of data at location 340 that need redacting. In this example, analyze 530 may identify specific pixels in each frame, a specific portion of the audio track, or particular frequencies of the audio track at location 340 that should be altered to comply with the redaction policy.

Analyze 530 may generate and/or store any information to identify a location in recorded data 134 that should be redacted. Analyze 530 may generate and/or store any information to identify what action was taken at a location to redact data.

Found 540

Found 540 determines whether analyze 530 identified data that should be redacted. If analyze 530 found data that should be redacted then execution moves to generate 550. If analyze 530 did not find data that should be redacted then execution moves to all analyzed 560.

Generate 550

Generate 550 generates redaction criteria. As discussed above, redaction criteria may include locations in original data where redactions should be performed and the types of redactions that should be performed at the locations. Redaction criteria may include one or more locations and one or more redactions that should be performed at each location. For example, redaction criteria may include location 330 as a location that should be redacted. For location 330, redaction criteria may identify the types of redactions that should be done as redacting faces (e.g., face 350) and weapons (e.g., weapon 352).

Generate 550 may receive information from analyze 530 to identify locations where redactions should be performed. Generate 550 may receive information from analyze 530 to identify the types of redactions that should be performed at a location.

Redaction criteria may be stored in any format. Redaction criteria may be stored as digital data. Redaction criteria may be stored in a memory (e.g., redaction criteria data store 1230). Redaction criteria may be retrieved from a memory. Redaction criteria may be stored and/or retrieved by a processing circuit (e.g., processing circuit 1260) of a server (e.g., server 210).

For example, redaction criteria 600 may include one or more entries (e.g., 610, 620, 630). Each entry may include an identifier, a location, and one or more redaction tasks.

An identifier may include any information for identifying a redaction entry. An identifier may uniquely identify an entry. An identifier may serially identify the entries in redaction criteria 600. An identifier may include a number, one or more alpha characters, and/or an alphanumeric identifier. For example, identifier 612, 622, and 632 for entries 610, 620, and 630 respectively include a number that serially numbers entries from 1 to N.

An entry may identify a location in data. A location may be the location identified by analyze 530 as a location that should be redacted. As discussed above, a location may be identified that may include a single point in time or a range in time. A location may include a start identifier and an end identifier. A start identifier and an end identifier may have the same value to identify a point in time or a particular location in recorded data. A start identifier and an end identifier may have different values to identify a range in time or a range of recorded data.

Location 330, start 332, end 334, time period 314 and location 340, start 342, end 344, time period 318 provide examples of how a location in data may be identified. Location 614, 624, and/or 634 may use any information (e.g., time, elapsed time, frame, start time, end time, pixel number, pixel area) or combination of information to identify a location and/or a range in data. Information as to a location may be stored in location 614, 624, and 634 in any format and/or manner so that the location may be identified in recorded data and related recorded data.

Each entry in redaction criteria 600 may include one or more redaction tasks. A redaction task may identify a type of redaction that should be performed at a location. A redaction task may be a task identified by analyze 530 to redact data in accordance with a policy. A redaction task may specify the type of information that should be identified and redacted if found.

For example, at location 330, redactions tasks include redact faces and weapons. At location 340, redaction tasks include redact faces and obscenities. The redaction tasks are the tasks that should be performed, if possible, to redact data at a location.

A redaction criteria entry may identify the original data (e.g., recorded data 134, 114, 124, 154) that resulted in the entry. When generating redaction criteria using a single source (e.g., recorded data 134), the source may be identified for all entries of the redaction criteria. In the case where recorded data from two or more sources (e.g., 910, 920, 930, 970) are used to generate redaction criteria, the source may be identified in each entry of the redaction criteria.

A redaction criteria entry may specify how a redaction may be made in the event that data is identified that needs redacting. For example, an entry in redaction criteria may specify that redaction, if performed, may be accomplished by blurring the data that should be redacted.

Redaction criteria is generated in accordance with a redaction policy. Recorded data may be analyzed to generate a first redaction criteria in accordance with a first redaction policy, a second redaction criteria in accordance with a second redaction policy, and so forth. Each redaction policy may redact data in accordance with specific goals or a specific audience. A first redaction criteria that is generated using a first redaction policy may be different from a second redaction criteria that is generated using a second redaction policy. Redaction performed using the first redaction criteria may generate redactions that are different than the redactions made in accordance with the second redaction criteria. Recorded data may be analyzed in accordance with a plurality of redaction policies. The redaction criteria generated from using each redaction policy may be stored. A specific redaction criteria may be retrieved from storage when related data needs to be redacted in accordance with the policy that generated the redaction criteria. Because redaction is more efficient using redaction criteria, as opposed to analysis using a redaction policy, redacted data need not be stored. Only recorded data and redaction criteria need be stored and redacted data produced using redaction criteria when needed (e.g., on demand).

All Analyzed 560

All analyzed 560 determines whether the data received by receive original 510 has been analyzed. Data may be analyzed to identify data that should be redacted in any manner. For example, analysis may include breaking the data into subsets and analyzing each subset. Redaction criteria entries are created for all locations identified in each subset. When all subsets have been analyzed, method 500 may end at end 570. Data analysis in analyze 530 may proceed until it identifies a location where redaction should be performed. Upon identifying a location, execution may move to found 540, which continues to generate 550. After generate 550 generates an entry in redaction criteria 600, analyzed 560 may determine whether all of the data has been analyzed. If all of the data has not been analyzed, analysis may resume where it left off until all data has been analyzed.

When all data received by receive original 510 has been analyzed, and redaction criteria generated if necessary, execution moves to end 570.

Method 500 terminates at end 570.

Redaction of Related Data Using Redaction Criteria

Redaction criteria generated from analysis of one recorded data (e.g., 134) may be used to redact related data (e.g., 134, 114, 124, 154). Redaction criteria may be used to identify locations in related data for redaction. Redaction of related data may be performed only at the locations identified in the redaction criteria. Analyzing related data only at the locations identified in the redaction criteria reduces the amount of analysis (e.g., processor time) needed to redact related data.

Figure 7:
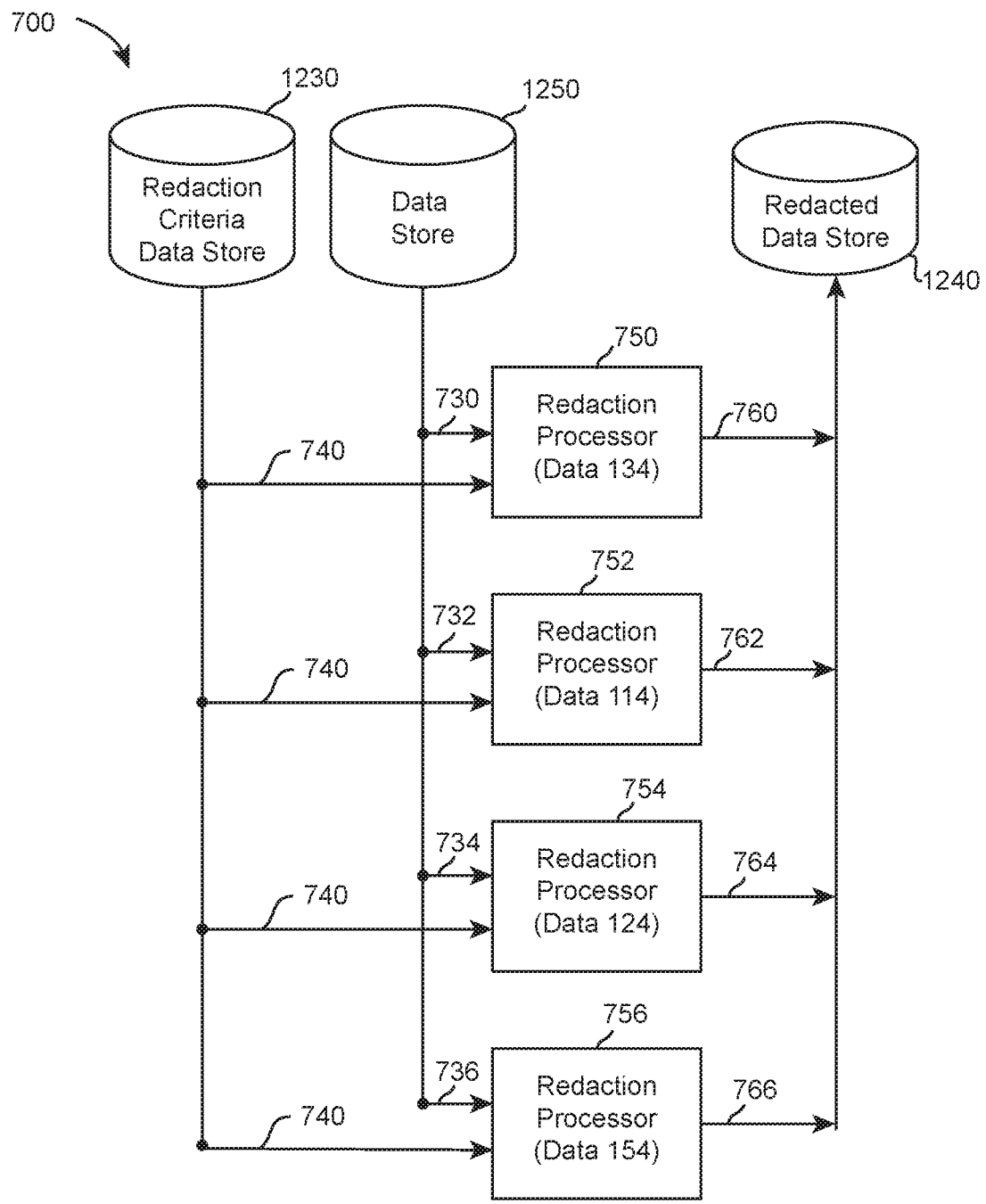
FIG. 7 is a block diagram a system for using redaction criteria to redact recorded data.

System 700 is an implementation of a system that uses redaction criteria to redact related data. System 700 may be implemented as hardware components to perform the functions that will be discussed below. System 700 may be a combination of hardware components and software that is executed by a processing circuit to perform the functions. Related data may be redacted using redaction criteria in parallel, as shown in FIG. 7, or serially.

System 700 includes redaction criteria data store 1230, data store 1250, redacted data store 1240, and redaction processor 750, 752, 754, 756, and 758.

Data store 1250 stores recorded data. Data store 1250 provides recorded data. Data store 1250 provides related recorded data (e.g., 134, 114, 124, 154). Data store 1250 stores information for identifying related recorded data. Data store 1250 stores information for aligning related recorded data. Data store 1250 provides the recorded data that was used to generate redaction criteria. Data store 1250 provides data related to the recorded data that was used to generate redaction criteria.

Redaction criteria data store 1230 stores redaction criteria. Redaction criteria stored by redaction criteria data store 1230 includes redaction criteria 600. Redaction criteria data store 1230 provides redaction criteria. Redaction criteria data store 1230 may provide the redaction criteria for recorded data that is stored in data store 1250.

A redaction processor (e.g., 750, 752, 754, 756, and 758) receives recorded data (e.g., 134, 114, 124, 154), alignment data for aligning the recorded data, and redaction criteria.

Alignment data permits the recorded data (e.g., 134, 114, 124, 154) to be aligned in time so that a particular location identified in one recorded data may be identified in the other recorded data. For example, alignment data aligns recorded data 134, 114, 124, and 154 so that location 330 as identified in recorded data 134 may be found in recorded data 114, 124, and 154.

Redaction criteria is discussed above. Redaction criteria identifies a location and one or more redaction tasks to be performed at the location. Redaction criteria may be related to (e.g., based on, generated from) one or more recorded data that are related. In the examples provided above, recorded data 134 was used to generate redaction criteria that may be used to redact recorded data 134, 114, 124, and 154. Below, examples of how two or more recorded data (e.g., 910, 920, 930, 970) may be used to generate redaction criteria are discussed.

A redaction processor receives recorded data, alignment data, and redaction criteria. A redaction processor generates redacted data in accordance with the redaction criteria. The redacted data generated by the one or more redaction processors may be stored in redacted data store 1240.

Figure 8:
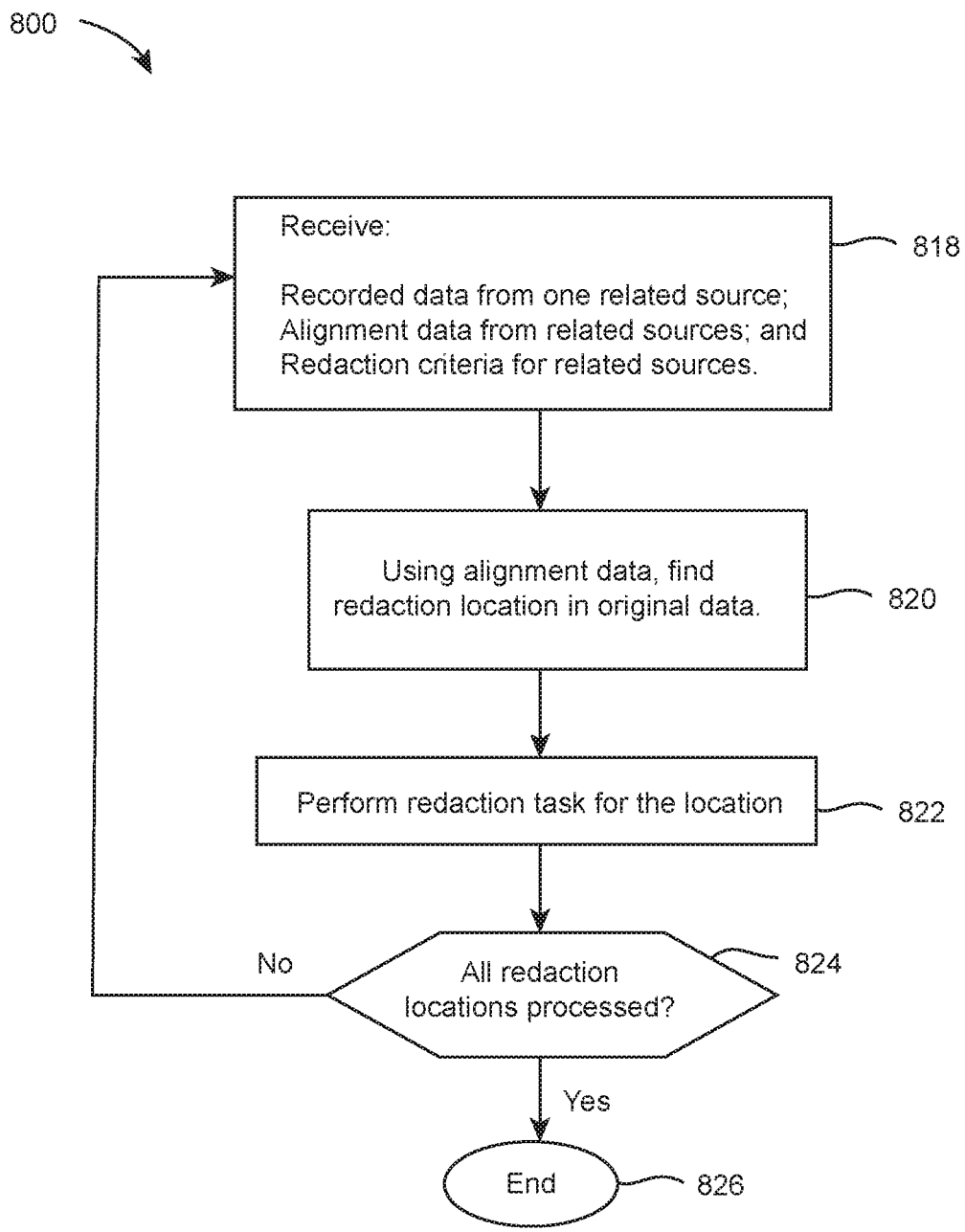
FIG. 8 is a diagram of a method for using redaction criteria to redact recorded data.
Figure 9:
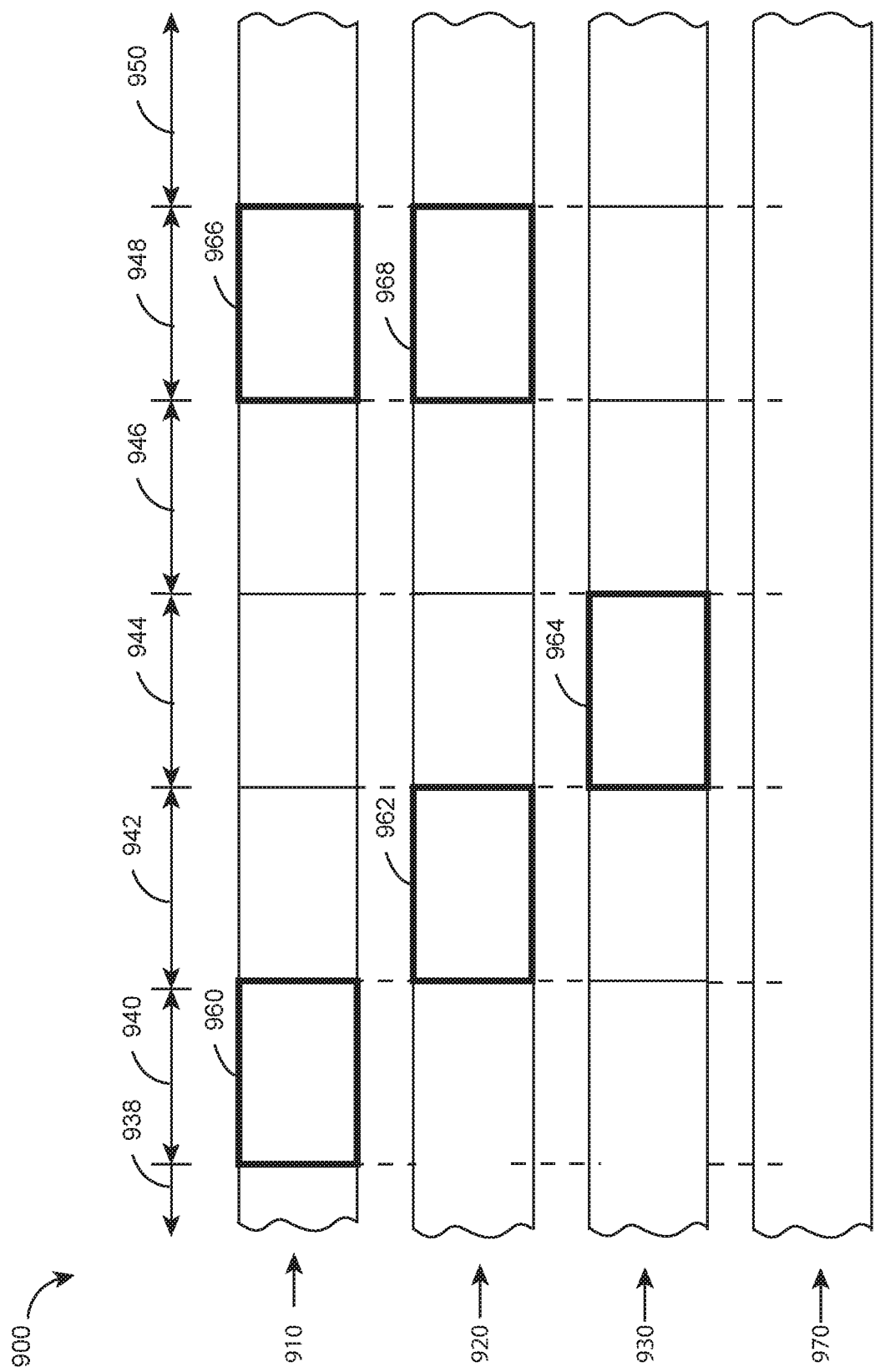
FIG. 9 is a diagram of a method for creating reaction criteria from related recorded data.

A redaction processor may be implemented using a processing circuit executing a stored program. A redaction processor may perform the steps of method 800 of FIG. 8 to generate redacted data in accordance with redaction criteria. Method 800 includes receive 818, find 820, perform 822, all 824, and end 826.

Recorded data may be redacted in parallel or in series. System 700 includes redaction processor 750, 752, 754, and 756 for redacting in parallel recorded data 134, recorded data 114, recorded data 124, and recorded data 154 in accordance with redaction criteria 740. A single redaction processor (e.g., 750) may be used to redact data 730, 732, 734, and 736 in series. Redacting in series may be accomplished by redaction processor 750 receiving and redacting recorded data 134, recorded data 114, recorded data 124, and recorded data 154 separately one after the other in any order.

While performing parallel processing as illustrated in FIG. 7, redaction processor 750, 752, 754, and 756 receive (e.g., receive 818) data 730, 732, 734, and 736 respectively from data store 1250. Data 730, 732, 734, and 736 may include alignment data and/or metadata. For example, data 730 may include alignment data, metadata, and recorded data 134, data 732 may include alignment data, metadata, and recorded data 114, data 734 may include alignment data, metadata, and recorded data 124, and data 736 may include alignment data, metadata, and recorded data 154.

Data store 1250 and/or processing circuit 1260 may identify recorded data that are related to each other. For example, data store 1250 and/or processing circuit 1260 may identify that recorded data 134, 114, 124, and 154 are related to each other because they recorded data at the same incident. In an implementation, data store 1250 and/or processing circuit 1260 may use alignment data to identify recorded data that are related.

Further in receive 818, redaction processor 750, 752, 754, and 756 receive redaction criteria 740 from redaction criteria data store 1230. Redaction criteria data store 1230 may provide redaction criteria that is related to (e.g., based on, generated from) one or more recorded data (e.g., 134, 114, 124, 154) provided by data store 1250. Processing circuit 1260 may cooperate with data store 1250 and redaction criteria data store 1230 to identify the redaction criteria that is related to the data provided to redaction processor 750, 752, 754, and 756.

In find 820, a redaction processor accesses the redaction criteria to find a location where a redaction should be made. The redaction processor may use the alignment data to find the location specified by the redaction criteria.

In perform 822, a redaction processor analyzes recorded data at the location to determine whether it needs to perform the redaction tasks specified for that location. If the redaction processor determines that the redaction tasks should be performed at the location, the redaction processor generates redacted data. In the event that the redaction processor determines that the redaction tasks cannot be performed on the recorded data at the location, the redaction processor provides unredacted recorded data. The portions of the recorded data for which there is no redaction criteria entry (e.g., time period 312, 316, 320) are provided as unredacted data. The redacted data, which includes data that may have been redacted at a specified location and data that has not been redacted are provided to redacted data store for storage.

All 822 determines whether all entries of the redaction criteria have been processed by the redaction processor. If all entries have been processed, the redaction process ends at end 826. If all entries have not been processed, execution returns to find 820 to use the redaction criteria to find another location where a redaction may need to be made.

For example, redaction processor 750, 752, 754, and 756 receive recorded data 134, 114, 124, and 154 respectively from data store 1250. Redaction processor 750, 752, 754, and 756 further receive alignment data from data store 1250 that enables the alignment of recorded data 134, 114, 124, and 154 to each other.

Redaction processor 750, 752, 754, and 756 further receive redaction criteria 740 from redaction criteria data store 1230. For this example, assume that recorded data 134 was analyzed to generate redaction criteria as discussed above. So, redaction criteria 600 for this example, has two entries. The first entry identifies location 330 and the redaction tasks of redacting faces and weapons. The second entry identifies location 340 and the reaction tasks of redacting faces and obscenities.

Redaction processor 750 uses the alignment data to find location 330 in recorded data 134. The data of time period 312 is not identified in the redaction criteria, so redaction processor 750 provides recorded data 134 for time period 312 without redaction.

At location 330 and in accordance with the redaction criteria for location 330, redaction processor 750 analyzes recorded data 134 at location 330 to identify faces and weapons. Redaction processor 750 identifies and redacts face 350 and weapon 352. Analysis of recorded data 134 to determine whether data should be redacted may be performed as discussed above with respect to analyze 430 or analyze 530; however, the redaction tasks of the redaction criteria, and not the redaction policy, identify the types of redactions that should be made. Redaction processor 750 provides data for location 330 that has face 350 and weapon 352 redacted.

Redaction processor 750 uses alignment data to find location 340 in recorded data 134. The data of time period 316 is not identified in the redaction criteria, so redaction processor 750 provides recorded data 134 for time period 316 without redaction.

At location 340 and in accordance with the redaction criteria for location 340, redaction processor 750 analyzes recorded data 134 to identify faces and obscenities. Redaction processor 750 identifies and redacts face 354 and obscenity 356. Analysis of recorded data 134 at location 340 to determine whether a redaction should be made may be performed as discussed with respect to analyze 430 or analyze 530 except the redaction tasks of the redaction criteria, and not the redaction policy, identify the types of redactions that should be made. Redaction processor 750 provides data for location 340 that has face 354 and obscenity 356 redacted.

The data of time period 320 does not include any locations identified in the redaction criteria, so redaction processor 750 provides recorded data 134 for time period 316 without redaction. The data provided by redaction processor 750 is stored in redacted data store 1240.

Redaction processor 752 uses the alignment data to find location 330 in recorded data 114. Redaction processor 752 uses the redaction tasks for location 330 to search for and redact face 362 and weapon 364. Redaction processor 752 uses the alignment data to find location 340 in recorded data 114. Redaction processor 752 uses the redaction tasks for location 340 to search for and redact face 366 and obscenity 368. Redaction processor 752 provides redacted data for locations 330 and 340. No redactions are specified by the redaction criteria for time periods 312, 316, and 320, so redaction processor 752 provides recorded data 114 without redaction for those portions of recorded data 114. The data provided by redaction processor 752 is stored in redacted data store 1240.

Redaction processor 754 uses the alignment data to find location 330 in recorded data 124. Redaction processor 754 uses the redaction tasks for location 330 to search for faces and weapons. Redaction processor 754 cannot identify a face at location 330, so redaction processor 754 does not perform the face redaction task at location 330. Redaction processor 754 searches for, finds, and redacts weapon 372. Redaction processor 754 uses the alignment data to find location 340 in recorded data 124. Redaction processor 754 uses the redaction tasks for location 340 to search for faces and obscenities. Redaction processor 754 cannot identify a face at location 340, so redaction processor 754 does not perform the face redaction task at location 340. Redaction processor 754 searches for, finds, and redacts obscenity 374. No redactions are specified by the redaction criteria for time periods 312, 316, and 320, so redaction processor 754 provides recorded data 124 without redaction for those portions of recorded data 124. The data provided by redaction processor 754 is stored in redacted data store 1240.

Redaction processor 756 uses the alignment data to find location 330 in recorded data 154. Redaction processor 756 uses the redaction tasks for location 330 to search for faces and weapons. Redaction processor 756 cannot identify a face at location 330, so redaction processor 756 does not perform the face redaction task at location 330. Redaction processor 756 searches for, finds, and redacts weapon 382. Redaction processor 756 uses the alignment data to find location 340 in recorded data 154. Redaction processor 756 uses the redaction tasks for location 340 to search for faces and obscenities. Redaction processor 756 cannot identify a face at location 340, so redaction processor 756 does not perform the face redaction task at location 340. Redaction processor 756 searches for, finds, and redacts obscenity 384. No redactions are specified by the redaction criteria for time periods 312, 316, and 320, so redaction processor 756 provides recorded data 154 without redaction for those portions of recorded data 154. The data provided by redaction processor 756 is stored in redacted data store 1240.

Using redaction criteria to identify the locations in the data where redactions might need to be performed reduces the amount of time needed to process the redactions because the portions of the recorded data (e.g., time periods 312, 316, and 320) that are not identified for redaction are not analyzed.

Using redaction criteria to identify the redaction tasks at a location in the data reduces the amount of time needed to process the redactions because the potential redactions are limited to the identified tasks and analysis in accordance with the entire redaction policy does not need to be done. For example, at location 330, the identified redaction tasks are to redact faces and weapons only. The redaction policy may also require the redaction of street signs, clocks, personal data, and license plates, but the analysis of recorded data 134 at location 330 did not find any street signs or license plates, so the related data (e.g., 114, 124, 154) at location 330 need to search for street signs, clocks, personal data, or license plates. The redaction tasks reduce the amount of analysis that needs to be done to perform a possible redaction as compared to analyzing with respect to all the possible redactions specified in a redaction policy.

Redaction Criteria from Two or More Data Sources

Redaction criteria does not need to be related to a single source of data. Reaction criteria may be generated by analyzing at least a portion of two or more recorded data that are related. As discussed above, portions of recorded data 910, 920, and 930 may be analyzed to produce redaction criteria that may be used to redact recorded data 910, 920, 930, and 970.

Above, the analysis of recorded data 134 was discussed. In the examples provided above, the entirety of recorded data 134 was analyzed (e.g., method 500) to identify locations 330 and 340 where redactions should be performed. When generating redaction criteria from multiple sources of recorded data (e.g., 910, 920, 930), the entirety of each recorded data may be analyzed to identify locations where redaction should be performed. For example, all of recorded data 910, 920, and 930 could be analyzed using method 500 to identify locations in accordance with a redaction policy where redactions should be performed. Analyzing the entirety of recorded data 910, 920, and 930 to generate redaction criteria may be time consuming because all data of three of four related data is analyzed.

Another approach, to reduce the amount of time required to perform analysis, is to identify portions of each recorded data that should be analyzed to generate redaction criteria, so that only the identified portions are analyzed. Once the portions are identified, only the identified portions of the recorded data are analyzed in accordance with a redaction policy to generate redaction criteria. For example, portions 960 and 966 of recorded data 910, portions 962 and 968 of recorded data 920, and portion 964 of recorded data 930 are identified as portions to be analyzed to produce redaction criteria. The other portions of each recorded data are not analyzed and no portion of recorded data 970 is analyzed.

The portions of the recorded data that are to be analyzed may be selected (e.g., identified) using any method. In one implementation, the entirety of each recorded data (e.g., 910, 920, 930, 970) is analyzed (e.g., method 500) to identify a few, but not all, of the redaction types specified in the redaction policy. The most prevalent types of redactions (e.g., faces, license plates, human form) may be selected to analyze the recorded data to identify portions. The analysis using the few redaction types may also be accelerated by performing sufficient analysis only to identify the likelihood that the redaction type occurs in the data without identifying exact pixels or frequencies. Once the portions are identified, they may be fully analyzed in accordance with a redaction policy.

For example, the entirety of recorded data 910, 920, 930, and 970 may be analyzed to determine where license plates appear in the data. The analysis may be simplified to identify the images of numbers or alpha characters without performing additional analysis to verify that the numbers or alpha characters are part of a license plate. If the image of a number or alpha character is identified, then that portion of the recorded data is marked as a portion for additional (e.g., full, complete) analysis. In accordance with this example, images of numbers or alpha characters were identified in portions 960, 962, 964, 966, and 968 of recorded data 910, 920, and 930.

In another implementation, identifying portions of recorded data for generating redaction criteria may be determined by proximity of the recorded data to the occurrences of an incident. For example, assume that the incident was the chase and capture of a criminal. During time period 940 and 948, the camera the recorded data 910 was the closest to the criminal, so portions 960 and 966 are identified for full analysis to produced redaction criteria. During time period 942, the camera that recorded data 920 was the closest to the criminal, so portion 962 is identified for full analysis to produce redaction criteria. During time period 948, the camera that recorded data 920 was as close to the criminal as the camera that recorded data 910, so portion 968 is identified for full analysis to produce redaction criteria. During time period 946, the camera that recorded data 930 was the closest to the criminal, so portion 964 is identified for full analysis to produce redaction criteria. Identifying portions by proximity may include a threshold, so that a camera that is farther away from the occurrences of the incident than the threshold likely did not record any data that would be of use to generate redaction criteria. In this example, during time periods 938, 944, and 950, no camera was within the distance threshold to the occurrences of the incident, so those portions are not identified for analysis to generate redaction criteria. The camera that recorded data 970 was not the closest to the occurrences of the incident or was outside the threshold, so no portion of recorded data 970 is identified for analysis to produce redaction criteria.

In another implementation, the recording device that captures and records the recorded data also detects and identifies objects that are likely to be included in a redaction policy. The recording device detects the object. The recording device stores data regarding detection of the object. The recording device stores data identifying wherein the recorded data the object was detected. A recording device may record data regarding detected objects as metadata. A server may analyze the metadata of recorded data (e.g., 910, 920, 930, 970) to determine whether particular objects were detected in the recorded data. The portions of the recorded data where objects of interest were detected are identified as portions (e.g., 960, 962, 964, 966, 968) that should be analyzed to generate redaction criteria.

For example, cameras 112, 122, 132, 152, 230, 240, 250 may capable of analyzing the captured visual and audio data to detect some objects. For example, a camera may be capable of analyzing captured data to detect a license plate, a face, a weapon, a gunshot, and/or yelling. Upon detecting an object, the camera creates metadata that describes the object recognized (e.g., face, license plate, weapon, gunshot, yelling) and the location in the recorded data where the object was detected. The metadata of the recorded data may be analyzed to identify the portions of the recorded data (e.g., 960, 962, 964, 966, 968) that should be analyzed to generate redaction data. For example, the metadata of recorded data 910 may report that a license plate was detected during time period 940 and a face was detected during time period 948, so the time periods are identified as portion 960 and 966 respectively.

In other implementation, portions of recorded data may be identified by analyzing the recorded data for intensity (e.g., gun shot, yelling) of sound or light in visual data, movement in visual data, color, luminance, density of objects, number of objects, presence of lines, and/or a histogram of the visual data. Upon detecting the desired properties in the data, the portion of the data is identified as a portion for analysis to generate redaction criteria.

Once portions (e.g., 960, 962, 964, 966, 968) of the recorded data are identified, the portions of the recorded data may be analyzed to generate redaction criteria. For example, portions 960, 962, 964, 966, and 968 may be analyzed using method 500 to generate redaction criteria. As discussed above, redaction criteria may be stored in any manner. Redaction criteria may include redaction identifiers, locations, redaction tasks, source of data, and/or information on how to alter data that should be redacted.

For example, analysis of portion 960 may generate entries 1010 through 1020 of redaction criteria 1000. Any number of entries may occur between entry 1010 and 1020. Each entry includes a redaction identifier (e.g., 1012, 1022), a location (e.g., 1014, 1024), and one or more redaction tasks (e.g., 1016, 1026).

Analysis of portion 962 may generate entries 1030 through 1040 of redaction criteria 1000. Any number of entries may occur between entry 1030 and 1040. Each entry includes a redaction identifier (e.g., 1032, 1042), a location (e.g., 1034, 1044), and one or more redaction tasks (e.g., 1036, 1046).

Analysis of portion 966 may generate entries 1050 through 1060 of redaction criteria 1000. Any number of entries may occur between entry 1050 and 1060. Each entry includes a redaction identifier (e.g., 1052, 1062), a location (e.g., 1054, 1064), and one or more redaction tasks (e.g., 1056, 1066).

Analysis of portions 964 and 968 may generate additional entries in redaction criteria 1000.

After the portions 960, 962, 964, 966, and 968 have been analyzed, for example using method 500, and redaction criteria 1000 generated, redaction criteria 1000 may be stored in redaction criteria data store 1230. Redaction criteria 1000 may also be used to redact recorded data 910, 920, 930, and 970 as discussed above, for example with respect to system 700 and/or method 800. The redacted versions of recorded data 910, 920, 930, and 970 may be stored in redacted data store 1240.

Implementation of a Recording Device

Figure 11:
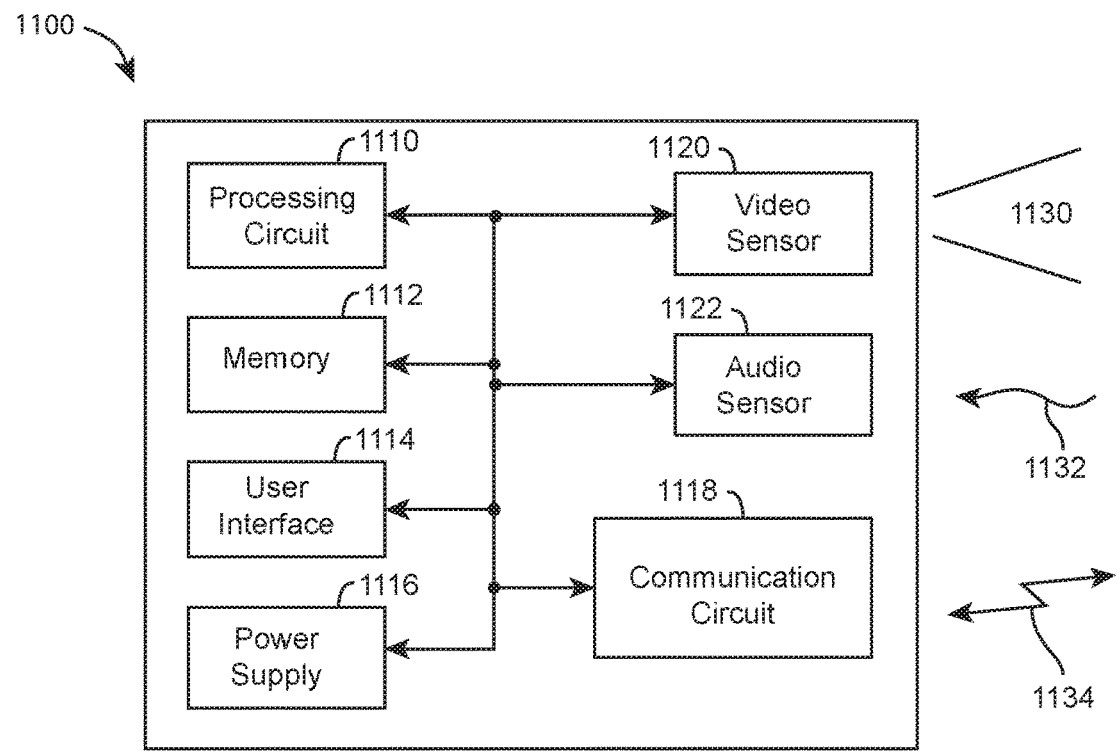
FIG. 11 is a block diagram of an implementation of a recording device.

Recording device 1100 of FIG. 11 is an implementation of cameras 112, 122, 132, 152, 230, 240, and/or 250. Recording device 1100 includes processing circuit 1110, memory 1112, user interface 1114, power supply 1116, video sensor 1120, audio sensor 1122, and communication circuit 1118. Video sensor 1120 detects light in field of view 1130. Audio sensor 1122 detects sound 1132. Communication circuit 1118 transmits and receives data via communication link 1134. Communication link 1134 may be a wired link and/or a wireless link.

Processing Circuit

A processing circuit includes any circuitry and/or electrical/electronic subsystem for performing a function. A processor circuit may include circuitry that performs (e.g., executes) a stored program. A processing circuit may execute one or more stored programs at the same time (e.g., in parallel).

A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (e.g., op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive data from other circuits and/or components of a system. A processing circuit may receive status information from and/or regarding the operation of other components of a system. A processing circuit may perform one or more operations, perform one or more calculations, provide commands (e.g., instructions, signals) to one or more other components responsive to data and/or status information. A command provided to a component may instruct the component to start operation, continue operation, alter operation, suspend operation, and/or cease operation. Commands and/or status may be communicated between a processing circuit and other circuits and/or components via any type of buss including any type of conventional data/address bus.

A Memory

A memory stores information. A memory provides previously stored information. A memory may provide previously stored information responsive to a request for information. A memory may store information in any conventional format. A memory may store electronic digital information. A memory may provide stored data as digital information.

A memory includes any semiconductor, magnetic, optical technology, or combination thereof for storing information. A memory may receive information from a processing circuit for storage. A processing circuit may provide a memory a request for previously stored information. Responsive to the request the memory may provide stored information to a processing circuit.

A memory may include any circuitry for storing program instructions and/or data. Storage may be organized in any conventional manner (e.g., program code, buffer, circular buffer). Memory may be incorporated in and/or accessible by a transmitter, a receiver, a transceiver, a sensor, a controller, and a processing circuit (e.g., processors, sequential logic).

A memory may perform the functions of a data store and/or a computer-readable medium.

User Interface

A user interface provides an interface between a user and an electronic device. A user interface enables communication between a user and an electronic device. A user interface enables a human user to interact with an electronic device. A user may control, at least in part, an electronic device via the user interface. A user may provide information and/or commands to an electronic device via a user interface. A user may receive information and/or responses from the electronic device via the user interface.

A user interface may include one or more controls (e.g., switches, buttons, touch screen) that permit a user to interact and/or communicate with a device to control (e.g., influence) the operation (e.g., functions) of the device.

A user interface may provide information to a user. A user may receive visual, haptic (e.g., tactile, kinesthetic), and/or audible information from a user interface. A user may receive visual information via devices (e.g., indictors) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed. A user interface may include a communication circuit for transmitting information to an electronic device for presentation to a user. For example, a user interface may wirelessly transmit information to a smart phone for presentation to a user.

A user interface may include voice-to-text or voice-to-instructions converters so that a user may interact with the user interface verbally (e.g., by voice).

Power Supply

A power supply provides power (e.g., energy). A power supply may provide electrical power. Providing electrical power may include providing a current at a voltage. Electrical power from a power supply may be provided as a direct current ("DC"). Electrical power from a power supply may be provided as an alternating current ("AC"). A power supply may include a battery. A power supply may provide energy for performing the functions of a device. A power supply may provide energy for operating the electronic and/or electrical components (e.g., parts) of a device.

The energy of a power supply may be renewable or exhaustible. The energy from a power supply may be converted to another form (e.g., voltage, current, magnetic) to another form to perform the functions of a device.

Video Sensor

A video sensor detects light. A video sensor detects light in a field of view. A video sensor detects light to capture images within the field of view. A video sensor may capture an image or sequence of images. A video sensor may include any conventional device for capturing an image or a sequence of images. A video sensor may include a semiconductor device such as charged coupled device (e.g., CCD).

A video sensor may convert detected light into numerical values that represent the image captured by the video sensor. The numerical values may be provided as analog and/or digital values. The numerical values may be stored in a memory. Storing an image in a memory records the image. A processing circuit may cooperate to transfer the captured images from a video sensor to a memory for storing.

Audio Sensor

An audio sensor detects sound. An audio sensor detects sound in the area of the audio sensor. An audio sensor detects sound to capture sounds in the area. An audio sensor may capture sounds that occur during a period of time. An audio sensor may include any conventional device for capturing sound, such as a microphone.

An audio sensor may convert detected sound into numerical values that represent the sound captured by the audio sensor. The numerical values may be provided as analog and/or digital values. The numerical values may be stored in a memory. Storing a sound in a memory records the sound. A processing circuit may cooperate to transfer the captured sounds from an audio sensor to a memory for storing.

Capturing and storing detected sounds may be coordinated with capturing and storing detected images so that the occurrence of the sound corresponds to (e.g., is synchronized to) the appearance of the image.

Communication Circuit

A communication circuit may transmit and/or receive information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums. A communication circuit may communicate using any wireless (e.g., Bluetooth, BLE, Zigbee, WAP, WiFi, NFC, IrDA, LTE, GSM, GPRS, EDGE, EV-VO, 3G, 4G, 5G) and/or wired (e.g., USB, RS-232, Firewire, Ethernet) communication protocols. Short-range wireless communication (e.g. Bluetooth, Zigbee, NFC, IrDA) may have a limited transmission range of approximately 20 cm-100 m. Long-range wireless communication (e.g. GSM, GPRS, 3G, 4G, LTE, 5G) may have a transmission ranges up to 15 km. A communication circuit may receive information from a processing circuit for transmission. A communication circuit may provide received information to a processing circuit.

A communication circuit may include a transmitter and a receiver. A communication circuit may further include a decoder and/or an encoder for encoding and decoding information in accordance with a communication protocol. A communication circuit may further include a processing circuit for coordinating the operation of the transmitter and/or receiver or for performing the functions of encoding and/or decoding. A processing circuit of a system may perform the functions that a processing circuit of a communication circuit might perform.

A communication circuit in one system (e.g., server) may communicate with a communication circuit in another system (e.g., recording device). Communications between two systems may permit the two systems to cooperate in performing a function of either system.

Recording Device 1100

Video sensor 1120 detects light in field of view 1130 to capture visual images of objects that are in field of view 1130. Images from video sensor 1120 are stored in memory 1112. Audio sensor 1122 detects sound 1132. Captured sound from audio sensor 1122 is stored in memory 1112. Video sensor 1120 may capture images continuously as sequential frames of captured images. The sequential frames may be presented serially to provide video data. The operation of audio sensor 1122 may be coordinated with (e.g., synchronized to) the operation of video sensor 1120 so that the combination of the data captured by audio sensor 1122 and video sensor 1120 is recorded data (e.g., 134, 114, 124, 154, 910, 920, 930, 970) in the form of a movie (e.g., motion picture). The recorded data may be stored in any format, such as MPEG4 format.

Processing circuit 1110 may cooperate with and/or control video sensor 1120 and audio sensor 1122 to capture visual and audio data for storage in memory 1112. Recorded data from memory 1112 may be transmitted to a server (e.g., server 210) via communication circuit 1118 and communication link 1134.

A user of recording device 1100 may control the operation of recording device 1100, at least in part, via user interface 1114. For example, a user may start, stop, and/or pause recording of video and audio data. A user may further instruct recording device 1100 to transfer recorded data to a server (e.g., 210).

Processing circuit 1110 may analyze data captured by video sensor 1120 and/or audio sensor 1122. Processing circuit 1110 may generate metadata responsive to analysis. Processing circuit 1110 may associate metadata to data captured by video sensor 1120 and/or audio sensor 1122. Processing circuit 1110 may store metadata in memory 1112. Metadata may be stored as part of the recorded data.

Processing circuit 1110 may periodically generate, store in memory 1112, and transmit via communication circuit 1118 beacons that are associated with the data being captured by video sensor 1120 and audio sensor 1122 at the time of generation and/or transmission. The beacons may be received by other capture devices, stored in their memory, and associated with their captured data. The beacons may be used to align recorded data in time.

Processing circuit 1110 may analyze data captured by video sensor 1120 to identify objects. Responsive to identifying an object, processing circuit 1110 may create metadata that identifies the object and/or identifies the location of the object in the recorded data. Processing circuit 1110 may analyze data captured by audio sensor 1122 to identify sounds, words, or phrases. Responsive to identifying a sound, word, or phrase, processing circuit 1110 may create metadata that identifies the sound, word, or phrase and/or identifies the location of the sound, word, or phrase in the recorded data. The metadata may be used to identify portions of the recorded data that should be analyzed to generate redaction criteria.

System 1200

System 1200 is an implementation of a server (e.g., server 210). System 1200 may perform the functions of an evidence system. An evidence system receives recorded data, stores recorded data, aligns recorded data, analyzes recorded data to redact recorded data and/or generate redaction criteria, redacts recorded data, stores redaction criteria, identifies recorded data that is related to each other, identifies redaction criteria that is related to recorded data, and/or stores redacted data.

System 1200 includes redaction engine 1210, alignment engine 1220, redaction criteria data store 1230, redacted data store 1240, data store 1250, processing circuit 1260, memory 1270, and communication circuit 1280.

Data store 1250 stores recorded data. System 1200 may receive recorded data via communication circuit 1280. Data store 1250 may further store information related to recorded data such as alignment data, geographic position of the recording device that recorded the recorded data, and metadata including metadata regarding objects in the captured data identified by the recording device. The recorded data stored in data store 1250 is referred to above, in various places, as original data. The recorded data stored in data store 1250 may include data from a plurality of recording devices, metadata from a plurality of recording devices, and alignment data from a plurality of recording devices. Some or all of the recorded data stored in data store 1250 may be related. Data store 1250 may receive recorded data via communication circuit 1280.

Alignment engine 1220 aligns related recorded data. Alignment engine 1220 receives alignment data from data store 1250. Alignment engine 1220 may receive recorded data from data store 1250 that are related to each other. Alignment engine 1220 use alignment data to align the related recorded data. Alignment engine 1220 may provide the aligned data for storage or to redaction engine 1210.

Redaction criteria data store 1230 stores redaction criteria. Redaction criteria data store 1230 may store redaction criteria for one or more sets of related data. Redaction criteria data store 1230 may store one or more redaction criteria for the same related recorded data (e.g., 134, 114, 124, 154). Redaction criteria data store 1230 may store redaction data for the same related data that has been generated using different redaction policies.

Redaction engine 1210 may redact recorded data in accordance with redaction criteria (e.g., system 700 and method 800). Redaction engine 1210 may redact related recorded data (e.g., 134, 114, 124, 154) in parallel and/or in series. For example, redaction engine 1210 may receive aligned recorded data from alignment engine 1220. Redaction engine 1210 may receive redaction criteria (e.g., redaction criteria 600, redaction criteria 1000) from redaction criteria data store 1230. Redaction engine 1210 may redact the related recorded data in accordance with the redaction criteria. Redaction engine 1210 may store redacted data in redacted data store 1240.

Redaction engine 1210 may generate redaction criteria (e.g., method 500). Redaction engine 1210 may receive recorded data from data store 1250. Redaction engine 1210 may receive a redaction policy. Redaction engine 1210 may analyze all (e.g., recorded data 134 in FIG. 3) or a portion (e.g., portion 960, 962, 964, 966, 968) of the recorded data in accordance with the redaction policy. Redaction engine 1210 may generate redaction criteria in accordance with the redaction policy. Redaction engine 1210 may store the resulting redaction criteria in redaction criteria data store 1230. Redaction engine 1210 may associate redaction criteria with a redaction policy, recorded data, and/or related data. Redaction engine 1210 may store information that relates redaction criteria to a redaction policy, recorded data, and/or related data.

System 1200 may store redaction policies and/or receive redaction policies as needed. System 1200 may receive redaction policies via communication circuit 1280.

Processing circuit 1260 may control and/or coordinate the operation of redaction engine 1210, alignment engine 1220, redaction criteria data store 1230, redacted data store 1240, data store 1250, memory 1270, and communication circuit 1280. Processing circuit 1260 may perform some or all of the functions of redaction engine 1210 and alignment engine 1220.

Memory 1270 may store programs executed by processing circuit 1260. The stored programs stored in memory 1270, when executed, may perform some or all of the functions of system 1200 or any portion thereof. Memory 1270 may perform some or all of the functions of redaction criteria data store 1230, redacted data store 1240, and data store 1250.

Engine

The term "engine" as used herein refers to, in general, circuitry, logic embodied in hardware and/or software instructions executable by a processing circuit. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Software instructions for execution by a processing circuit may be written in any programming language, including but not limited to C, C++, COBOL, JAVA™, Python, PHP, Perl, HTML, CSS, JavaScript, VBScript, ASPX, HDL, and/or Microsoft .NET™ programming languages such as C #. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as software for execution by a processing circuit may be stored in any type of computer-readable medium. An engine may be stored on and executed by one or more general purpose computers, thus creating a special purpose computer configured to perform the functions of (e.g., provide by) the engine.

A system may include one or more processing circuits configured to perform the functions of the illustrated engines, though the processing circuit that performs the functions of an engine may not be expressly shown.

Data Store

As understood by one of ordinary skill in the art, a "data store" as described herein may be any suitable device configured to store data for access by a processing circuit. A data store receives data. A data store retains (e.g., stores) data. A data store retrieves data. A data store provides data for use by a system, a processing circuit, and/or an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in a computer-readable medium.

Redaction criteria data store 1230, redacted data store 1240, and data store 1250 perform the functions of a data store. A data store may be implemented using any computer-readable medium (e.g., memory). An engine (e.g., redaction engine 1210 and alignment engine 1220) or processing circuit 1260 may access a data store locally (e.g., via data bus), over a network, and/or as a cloud-based service.

A data store may include any computer-readable medium such as flash memory, random access memory (RAM), or hard disk memory.

Separate data stores described herein may be combined into a single data store, and/or a single data store described herein may be separated into multiple data stores.

Additional Claims

An implementation of a method disclosure includes the following.

A method, performed by a processing circuit, for redacting video data recorded by a plurality of cameras, the video data recorded at an incident, the method comprising: selecting a first video data recorded by a first camera of the plurality of cameras; analyzing the first video data in accordance with a redaction policy to identify redactions to the first video data; responsive to analyzing, storing a redaction criteria, the redaction criteria includes one or more first locations in the first video data and one or more redaction tasks for performing at each location; selecting a second video data recorded by a second camera of the plurality of cameras; aligning the second video data with the first video data in accordance with alignment information recorded by at least one of the first camera and the second camera at the incident; for each first location identified in the redaction criteria: finding a second location in the second video data that aligns with the first location; and redacting the second video data at the second location in accordance with the one or more redaction tasks identified for the first location.

The above method wherein redacting the second video data at the second location comprises performing only the redaction tasks identified in the redaction criteria for the first location.

The above method wherein selecting comprises: using data recorded by the first camera at the incident to identify the video data recorded by each camera of the plurality of cameras at the incident; and selecting the second video data from the identified video data.

A system for generating redaction criteria for a plurality of recorded data, the plurality of recorded data recorded at an incident, the system comprising: a processing circuit; and a data store; wherein, the processing circuit: receives a redaction policy; analyzes one recorded data of the plurality in accordance with the redaction policy to identify zero or more locations in the recorded data where one or more redaction tasks should be performed; for each location, storing in the data store an identifier, indicia of the location, and indicia of the one or more redaction tasks that should be performed at the location.

The above system wherein the processing circuit analyzes the entirety of the one recorded data.

A system for generating redaction criteria for a plurality of recorded data, the plurality of recorded data recorded at an incident, the system comprising: a processing circuit; and a data store; wherein, the processing circuit: receives a redaction policy; receives alignment data to align in time the plurality of recorded data; aligns one or more, but not all, of the recorded data of the plurality; analyzes one or more portions of the one or more aligned recorded data in accordance with the redaction policy to identify zero or more locations in the one or more portions of the aligned recorded data where one or more redaction tasks should be performed; for each identified location, storing in the data store an identifier, indicia of the location, and indicia of the one or more redaction tasks that should be performed at the location.

The above system wherein the processing circuit further: receives metadata related to the recorded data of the plurality of recorded data; and analyzes the metadata to identify the one or more portions to be analyzed.

A system for generating a plurality of redaction criteria for a plurality of recorded data, the plurality of recorded data recorded at an incident, the system comprising: a processing circuit; and a data store; wherein, the processing circuit: receives a plurality of redaction policies; receives alignment data to align in time the plurality of recorded data; aligns one or more, but not all, of the recorded data of the plurality; for each redaction policy of the plurality of redaction policies, analyzes one or more portions of the one or more aligned recorded data in accordance with the redaction policy to create one redaction criteria of the plurality of redaction criteria, each respective redaction criteria includes one or more entries, each entry includes an identifier, indicia of the location, and indicia of the one or more redaction tasks that should be performed at the location; and storing each redaction policy in the data store.

Final Paragraphs

The foregoing description discusses embodiments, which may be changed or modified without departing from the scope of the present disclosure as defined in the claims. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. While for the sake of clarity of description, several specific embodiments have been described, the scope of the invention is intended to be measured by the claims as set forth below. In the claims, the term "provided" is used to definitively identify an object that not a claimed element but an object that performs the function of a workpiece. For example, in the claim "an apparatus for aiming a provided barrel, the apparatus comprising: a housing, the barrel positioned in the housing", the barrel is not a claimed element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

What is claimed is:

1. A method for redacting video data recorded by a plurality of cameras, the video data recorded at a same incident, the method comprising:
   receiving a first recorded video data and a second recorded video data, the first recorded video data recorded at the same incident by a first camera of the plurality of cameras, and the second recorded video data recorded at the same incident by a second camera of the plurality of cameras;
   identifying information in the first recorded video data to be redacted;
   identifying one or more first frames of video data in the first recorded video data associated with the identified information to be redacted;
   performing a respective first redaction on each first frame of video data of the one or more first frames of video data in the first recorded video data; and
   for each first frame of video data of the one or more first frames of video data:
     finding a respective second frame of video data in the second recorded video data, the respective second frame of video data aligned in time with the first frame of video data, wherein the respective second frame of video data in the second recorded video data is found after the first frame of video data in the first recorded video data is identified; and performing the respective first redaction on the respective second frame of video data.

2. The method of claim 1 wherein performing the respective first redaction on the respective second frame of video data comprises performing the first redaction on the second recorded video data only on the respective second frame of video data.

3. The method of claim 1 further comprising not performing the respective first redaction on the second recorded video data on any frame of video data in the second recorded video data that does not align in time with the one or more first frames of video data in the first recorded video data.

4. The method of claim 1 wherein the one or more first frames of video data are identified by at least one of a location identifier, a start identifier, and an end identifier.

5. The method of claim 1 wherein performing the respective first redaction comprises performing one or more redaction tasks and electronically storing the one or more redaction tasks.

6. The method of claim 1 further comprising electronically storing the one or more first frames of video data in redaction criteria, wherein each respective second frame of video data in the second recorded video data is found using the one or more first frames of video data stored in the redaction criteria.

7. The method of claim 1 wherein performing the respective first redaction on the respective second frame of video data comprises searching for the identified information at the respective second frame of video data after the respective second frame of video data has been found in accordance with the first frame of video data.

8. The method of claim 1 comprising identifying a type of redaction that should be done for each first frame of video data of the one or more first frames of video data, wherein performing the respective first redaction on the respective second frame of video data includes performing the respective identified type of redaction on the respective second frame of video data.

9. The method of claim 1 wherein the first camera of the plurality of cameras and the second camera of the plurality of cameras are each selected from the group consisting of body-worn cameras and vehicle cameras.

10. The method of claim 1, wherein the first recorded video data comprises a first plurality of portions;
the second recorded video data comprises a second plurality of portions aligned in time with the first plurality of portions;
identifying the one or more first frames of video data comprises analyzing each portion of the first plurality of portions; and
performing the respective first redaction on the respective second frame of video data for each first frame of video data of the one or more first frames of video data comprises analyzing less than all of the second plurality of portions in accordance with the one or more first frames of video data.

11. A system for redacting video data recorded by a plurality of cameras, the video data recorded at a same incident, the system comprising:
a processing circuit; and
a data store; wherein:
the data store stores the video data recorded by the plurality of cameras;
the processing circuit identifies information in a first stored video data to be redacted in accordance with a redaction policy, the first stored video data recorded at the same incident by a first camera of the plurality of cameras;
the processing circuit identifies one or more first video frames in the first stored video data associated with the identified information to be redacted; and
for each first video frame of the one or more first video frames, the processing circuit:
identifies a respective first redaction task that when performed redacts the first stored video data at the first video frame in accordance with the redaction policy;
finds a respective second video frame in a second stored video data that aligns in time with the first video frame, the second stored video data recorded at the same incident by a second camera of the plurality of cameras; and
performs the respective first redaction task on the second stored video data at the respective second video frame.

12. The system of claim 11 wherein the processing circuit uses alignment data recorded by at least one of the first camera and the second camera at the same incident to determine that each first video frame of the one or more first video frames aligns in time with the respective second video frame.

13. The system of claim 12 wherein the alignment data comprises one or more time stamps.

14. The system of claim 12 wherein the alignment data comprises:
information transmitted by the first camera and received by the second camera; and
information transmitted by the second camera and received by the first camera.

15. The system of claim 11 wherein the one or more first video frames includes multiple frames comprising a range of the first stored video data, the range includes a start of the range in the first stored video data and an end of the range in the first stored video data.

16. A method, performed by a processing circuit, for redacting video data recorded by a plurality of cameras, the video data recorded at a same incident, the method comprising:
selecting a first recorded video data recorded at the same incident by a first camera of the plurality of cameras, the first recorded video data associated with a first redaction criteria;
selecting a second recorded video data recorded at the same incident by a second camera of the plurality of cameras, the second recorded video data associated with a second redaction criteria;
for a first video frame identified in the first redaction criteria:
finding a first corresponding video frame in the second recorded video data that aligns in time with the first video frame; and
redacting the second recorded video data at the first corresponding video frame in accordance with one or more redaction tasks identified for the first video frame; and
for a second video frame identified in the second redaction criteria:
finding a second corresponding video frame in the first recorded video data that aligns in time with the second video frame; and redacting the first recorded video data at the second corresponding video frame in accordance with one or more second redaction tasks identified for the second video frame.

17. The method of claim 16 further comprising aligning the first recorded video data with the second recorded video data in accordance with alignment information recorded by at least one of the first camera and the second camera at the same incident.

18. The method of claim 16 wherein the first redaction criteria and the second redaction criteria are generated by the processing circuit in accordance with a same redaction policy.

19. The method of claim 16 wherein the first redaction criteria and the second redaction criteria are generated in accordance with a first redaction policy and a second redaction policy respectively.

20. The method of claim 16 wherein the first redaction criteria are generated after the first recorded video data is recorded by the first video camera and the second redaction criteria are generated after the second recorded video data is recorded by the second video camera.

* * * * *